United States Patent
Kikuchi

(10) Patent No.: US 8,400,680 B2
(45) Date of Patent: Mar. 19, 2013

(54) PRINTING CONTROL APPARATUS, PRINTING CONTROL METHOD, AND COMPUTER-READABLE STORAGE MEDIUM

(75) Inventor: Hiroshi Kikuchi, Musashino (JP)

(73) Assignee: Canon Kabushiki Kaisha, Tokyo (JP)

( * ) Notice: Subject to any disclaimer, the term of this patent is extended or adjusted under 35 U.S.C. 154(b) by 826 days.

(21) Appl. No.: 12/501,236

(22) Filed: Jul. 10, 2009

(65) Prior Publication Data

US 2010/0007902 A1    Jan. 14, 2010

(30) Foreign Application Priority Data

Jul. 11, 2008   (JP) .................................. 2008-180983

(51) Int. Cl.
*H04N 1/40*    (2006.01)
(52) U.S. Cl. .......................... 358/2.1; 358/3.32; 358/1.18
(58) Field of Classification Search .................... 358/1.9, 358/2.1, 1.18, 3.32, 500, 504, 515–521, 530, 358/400, 406
See application file for complete search history.

(56) References Cited

U.S. PATENT DOCUMENTS

| 6,491,324 | B1 * | 12/2002 | Schmitz et al. ................. 283/82 |
| 6,688,221 | B1 * | 2/2004 | Kaule ........................... 101/129 |
| 2007/0024880 | A1 | 2/2007 | Sato | |

FOREIGN PATENT DOCUMENTS

| CN | 1454781 | A | 11/2003 |
| CN | 1606329 | A | 4/2005 |
| JP | 2004314645 | A | * 11/2004 |
| JP | 2005225124 | A | 8/2005 |
| JP | 2006-309685 | A | 11/2006 |
| JP | 2008145453 | A | 6/2008 |

* cited by examiner

Primary Examiner — Thomas D Lee
Assistant Examiner — Stephen M Brinich
(74) Attorney, Agent, or Firm — Canon USA Inc IP Division

(57) ABSTRACT

Flexible specifying is enabled in the event of using data created with a general application to specify printing by layering a color toner image and optional special color toner image. A printer driver specifies pages to perform printing using a clear toner out of the page group received from the application, generates a job including data for layering as to the same face on the same sheet and printing a clear toner page which is a specified page, and a color toner page which is a page not specified for clear toner in the page group, and sends this to the printer.

15 Claims, 35 Drawing Sheets

FIG. 4

PRINTING SETTINGS — 401

? ✕ — 402

| PAGE SETTINGS | FINISHING | PAPER SUPPLY | PRINTING QUALITY |

FAVORITES: ◉ DEFAULT SETTINGS ▶ ☆ ◇

OUTPUT METHOD: ◎ PRINTING ▶ — 403

ORIGINAL DOCUMENT SIZE: A4 — 404

OUTPUT SHEET SIZE: SAME SIZE AS ORIGINAL — 405

NUMBER OF COPIES: 1 — 412

PRINTING DIRECTION:
☐ ◉ PORTRAIT  ☐ ○ LANDSCAPE

PAGE LAYOUT: ONE PAGE PER SHEET (DEFAULT) ▶ — 406

☐ SPECIFY ENLARGE/REDUCE
ENLARGE/REDUCE 100 % (25–200) — 407

☐ STAMP  EDIT STAMP — 408

[USER DEFINED SHEET] — 409  [PAGE OPTIONS] — 410  [RETURN TO DEFAULTS] — 411

PREVIEW

CONFIRM SETTINGS  OK  CANCEL  APPLY (A)

FIG. 22
2101 APPLICATION DOCUMENT
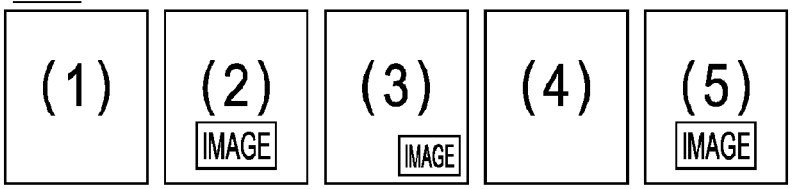
2102 COLOR TONER PAGE JOB
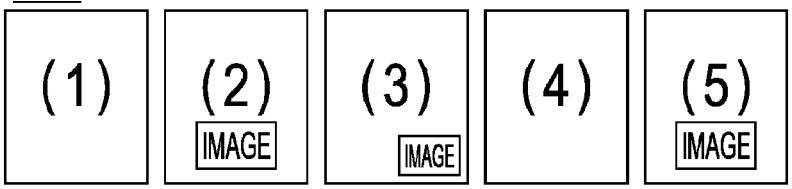
2103 CLEAR TONER PAGE REGISTRATION JOB
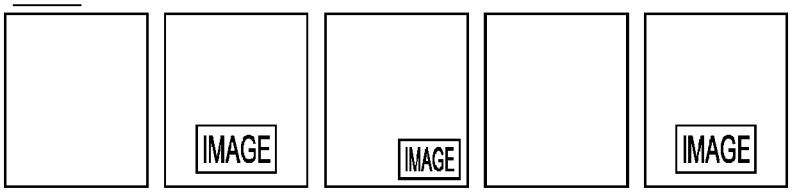
2104 PRINTING RESULTS
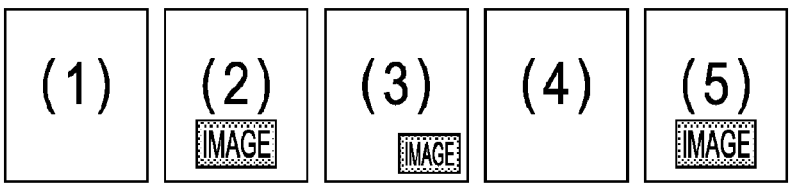

FIG. 24
CLEAR PAGE DDI FUNCTION DEFINITION LIST
| DDI FUNCTION | CLEAR PAGE DDI |
|---|---|
| ⋮ | ⋮ |
| DrvCopyBits | × |
| DrvPaint | × |
| DrvStrokePath | × |
| DrvTextOut | × |
| DrvResetPDEV | × |
| DrvQueryFont | × |
| DrvFillPath | × |
| DrvBitBlt | ○ |
| ⋮ | ⋮ |
FIG. 25
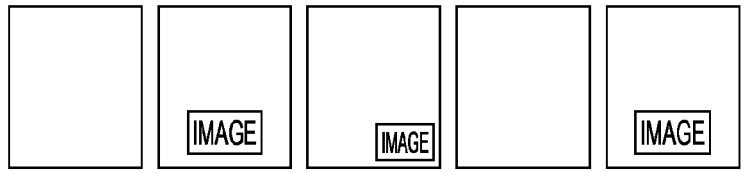
2401　CLEAR TONER PAGE REGISTRATION JOB IN EXAMPLE 3
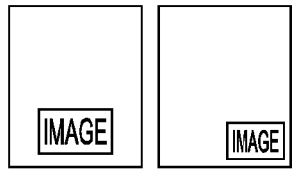
2402　CLEAR TONER PAGE REGISTRATION JOB IN EXAMPLE 4

FIG. 27

SAVED DDI FUNCTION LIST

| PAGE | DDI FUNCTION NAME | PARAMETER |
|---|---|---|
| 2 | DrvBitBlt | (10, 100, 200, 70) |
| 3 | DrvBitBlt | (80, 110, 50, 40) |
| : | : | : |

FIG. 28

CLEAR PAGE REFERENCE LIST

| COLOR TONER PAGE NUMBER | CLEAR TONER PAGE NUMBER |
|---|---|
| 2 | 1 |
| 3 | 2 |
| 5 | 1 |
| : | : |

FIG. 30

SAVED DDI FUNCTION LIST

| PAGE | DDI FUNCTION NAME | PARAMETER |
|---|---|---|
| 2 | DrvBitBlt ([ ], [ ], ,) | (10, 100, 200, 70) |
| : | : | : |

FIG. 31

CLEAR PAGE REFERENCE LIST

| COLOR TONER PAGE NUMBER | CLEAR TONER PAGE NUMBER | OFFSET X | OFFSET Y |
|---|---|---|---|
| 2 | 1 | 0 | 0 |
| 3 | 1 | 5 | −90 |
| : | : | : | : |

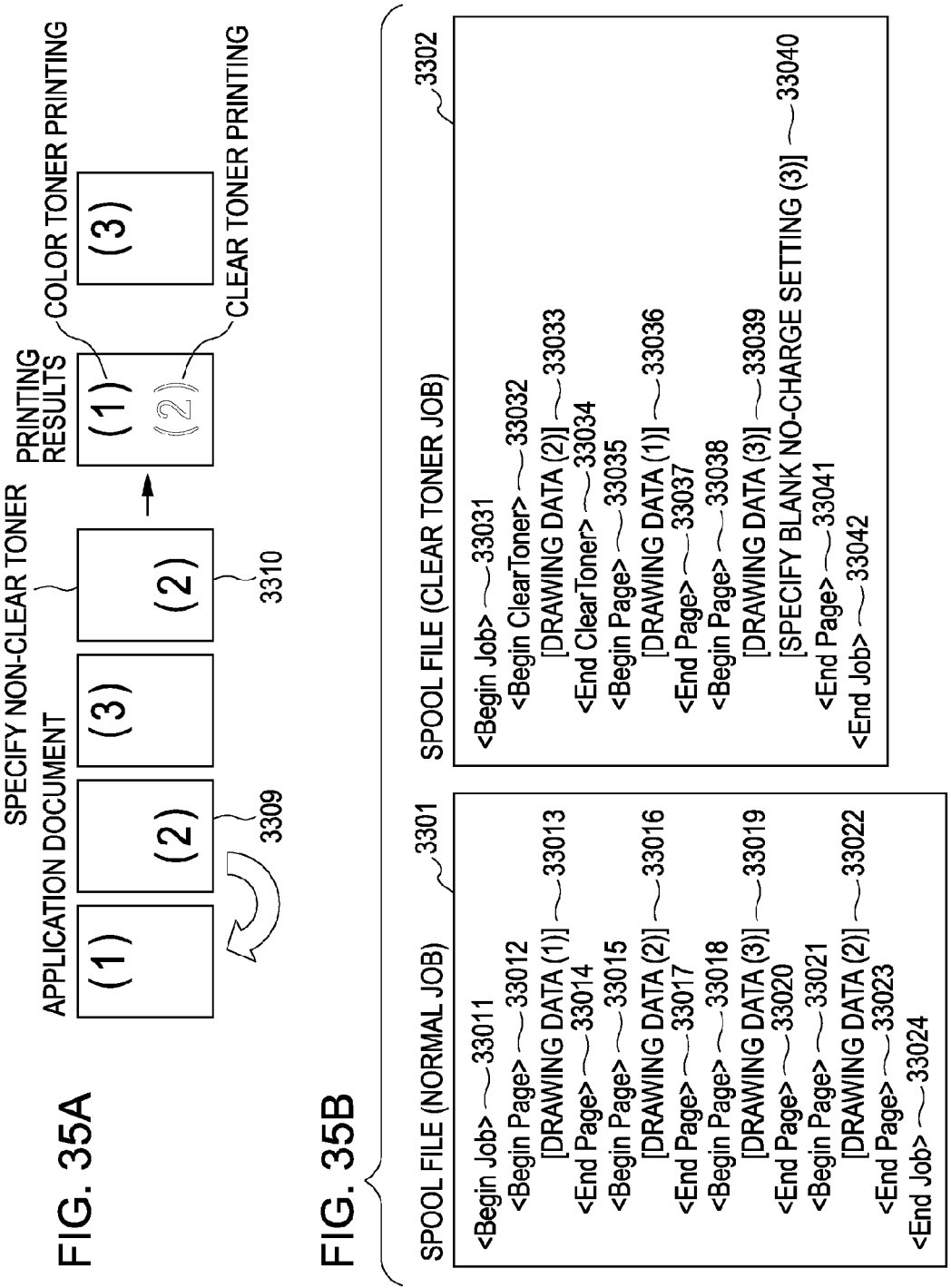

FIG. 36A

APPLICATION DOCUMENT

| (1) | (2) | (3) |

3409

SPECIFY NON-CLEAR TONER

| (4) |

3410

PRINTING RESULTS

| (1) | ← COLOR TONER PRINTING
| (2) | ← CLEAR TONER PRINTING (3)

FIG. 36B

SPOOL FILE (NORMAL JOB) ~ 3401

```
<Begin Job> ~ 34011
  <Begin Page> ~ 34012
    [DRAWING DATA (1)] ~ 34013
  <End Page> ~ 34014
  <Begin Page> ~ 34015
    [DRAWING DATA (2)] ~ 34016
  <End Page> ~ 34017
  <Begin Page> ~ 34018
    [DRAWING DATA (3)] ~ 34019
  <End Page> ~ 34020
  <Begin Page> ~ 34021
    [DRAWING DATA (4)] ~ 34022
  <End Page> ~ 34023
<End Job> ~ 34024
```

SPOOL FILE (CLEAR TONER JOB) ~ 3402

```
<Begin Job> ~ 34031
  <Begin Page> ~ 34032
    [DRAWING DATA (1)] ~ 34033
    <Begin ClearToner> ~ 34034
      [DRAWING DATA (2)] ~ 34035
    <End ClearToner> ~ 34036
  <End Page> ~ 34037
  <Begin Page> ~ 34038
    [DRAWING DATA (3)] ~ 34039
    [SPECIFY BLANK NO-CHARGE SETTING (3)] ~ 34040
  <End Page> ~ 34041
<End Job> ~ 34042
```

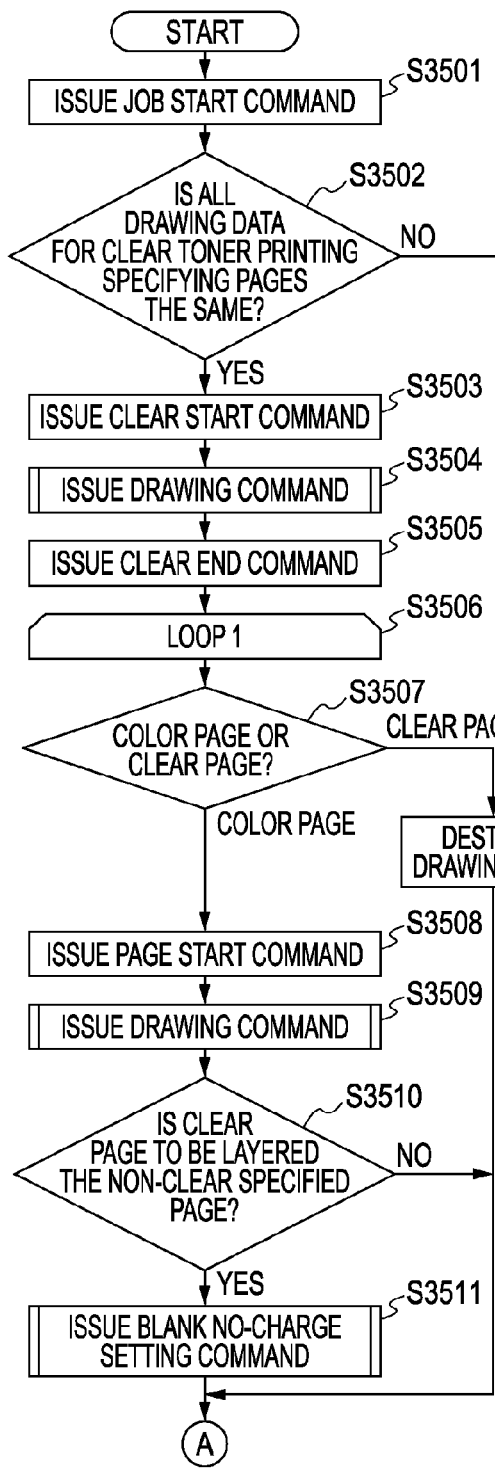
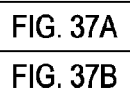
FIG. 37A
FIG. 37
FIG. 37A
FIG. 37B

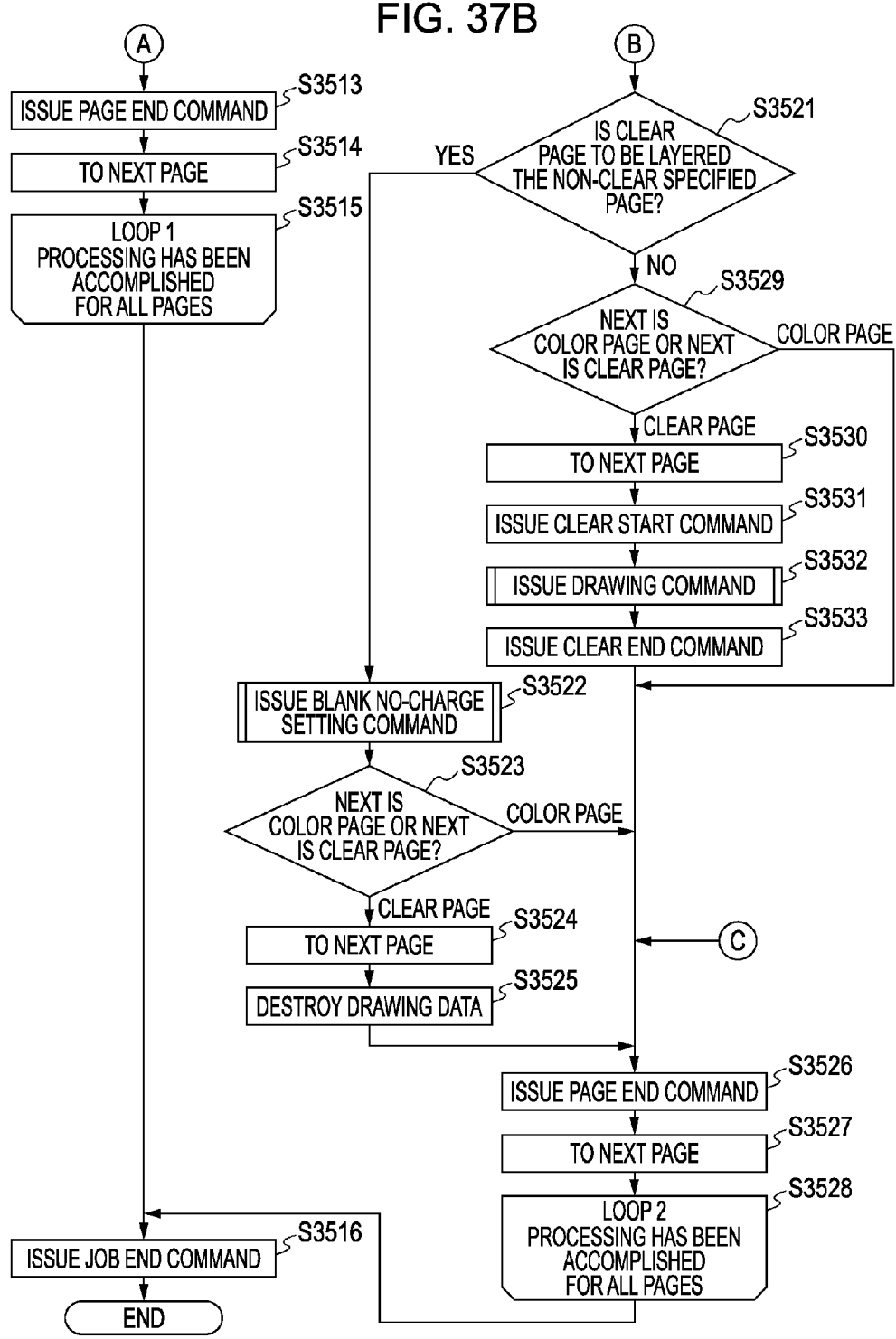

FIG. 38

STORAGE MEDIUM SUCH AS FD/CD-ROM

| DIRECTORY INFORMATION |
|---|
| FIRST PROCESSING PROGRAM<br>PROGRAM CODE GROUP CORRESPONDING TO FLOWCHART STEPS SHOWN IN FIG. 18 |
| SECOND PROCESSING PROGRAM<br>PROGRAM CODE GROUP CORRESPONDING TO FLOWCHART STEPS SHOWN IN FIG. 20 |
| THIRD PROCESSING PROGRAM<br>PROGRAM CODE GROUP CORRESPONDING TO FLOWCHART STEPS SHOWN IN FIG. 21 |
| FOURTH PROCESSING PROGRAM<br>PROGRAM CODE GROUP CORRESPONDING TO FLOWCHART STEPS SHOWN IN FIG. 37 |

PRINTING CONTROL APPARATUS, PRINTING CONTROL METHOD, AND COMPUTER-READABLE STORAGE MEDIUM

BACKGROUND OF THE INVENTION

1. Field of the Invention

The present invention relates to a printing control apparatus, printing control method, and computer-readable storage medium such as a printer driver corresponding to a printing apparatus that performs printing using multiple colored toners such as cyan, magenta, yellow, and black, and special color toner such as that for adjusting glossiness.

2. Description of the Related Art

Color laser printers that handle special color toner also known as special toner such as red and blue, in addition to the CMYK (cyan (C), magenta (M), yellow (Y), black (K)) toners which have been used up to now, have been increasing in recent years. Further, color laser printers that handle special color toner/special toner that has no color, such as toner to output gloss on printed material (special color toner such as that for adjusting glossiness) called transparent toner (hereafter called clear toner) and white toner have also been used. By effectively using such toners, the user can generate printed material having high added value.

For example, a printing apparatus has been proposed which prints (allover coating or partial coating) a clear toner overlaid onto color printed material (all or a portion thereof).

An allover coating using the clear toner prints a clear toner on one face of a sheet following performing color printing, thereby providing a glossy feel as to the sheet overall as with a photograph. Also, a partial coat using clear toner prints clear toner printing partially onto a sheet following performing color printing, thereby providing wide uses such as partial gloss or partial decoration.

Optionally specifying the clear toner printing location via a printer driver from a general application in order to realize a partial coat using the clear toner described above is normally difficult. This is because the color space of a graphics engine of a normal operating system (OS) cannot specify a transparent object such as that which is printed with clear toner. That is to say, a drawing object for clear toner does not exist in the drawing data to be drawn from a normal graphics engine.

Accordingly, Japanese Patent Laid-Open No. 2006-309685 describes as a method to specify clear ink printing locations, wherein a method is employed which uses clear ink only for image data of a portion specified as a range on a user interface of the printer driver. However, with this method, when specifying locations become many, specifying as a range on the user interface of the printer driver by the user has become time-consuming and complicated.

Also, Japanese Patent Laid-Open No. 2006-309685 describes another specifying method wherein an optional color is specified on the user interface of the printer driver, and only the objects in the specified color are replaced by clear ink and drawn. However, with this method, clear toner printing cannot be performed by layering onto the portion printed with color toner. In other words, controls such as coating an orange-colored text with clear toner so as to form text having a metallic gloss cannot be performed.

Note that even if the clear toner is instructed to be layered over the color toner with a similar method, the clear toner printing image cannot exceed the range of drawing information for the color toners printed from the application. That is to say, clear toner printing cannot be specified with an independent image that is completely different from the color toner printing image.

Note that performing clear toner printing specifying with an independent image, using a dedicated application, may be considered, but an optional general application cannot be used, meaning that ease-of-use suffers.

SUMMARY OF THE INVENTION

Embodiments of the present invention provide an arrangement wherein flexible specifying can be performed in the event of using data created with a general application to specify printing layering a color toner image and an optional special toner image. By using such a special toner e.g. a clear (transparent) toner, one can generate a special effect, such as gloss, on the printed material. Gloss is only one example of a special effect provided by a special toner, and a clear toner (transparent toner) is only one example of a special toner. Of course other embodiments may use different special toners to generate different special effects. For example, special toners, such as white toners or fluorescent toners, may be used when the color specification is thought to be difficult to implement with a normal graphics engine, such as a cyan magenta, yellow and black graphics engine.

A printing control apparatus according to embodiments of the present invention is a printing control apparatus for transmitting a job for printing using a plurality of color toners and a special toner, including: a special toner page specifying unit configured to specify that at least one page of a received page group from an application is to be printed using the special toner; a job generating unit configured to generate a job including data to layer and print to the same face of the same sheet with a special toner page that is a page specified by the special toner page specifying unit, and a color toner page which is a page not specified by the special toner page specifying unit; and a transmission unit configured to transmit the job generated by the job generating unit to a printing apparatus.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a diagram illustrating a first layer of a user interface with a printer driver.

FIG. 22 is a diagram schematically illustrating the application document, a color toner page job which the printer driver issues as to the printer, a clear toner page registration job which the printer driver generates, and the page output of the printing results.

FIG. 24 is a diagram illustrating an example of a DDI function definition list for a clear page which is held by the printer driver and used for determination of step S2204 in FIG. 23.

FIG. 25 is schematic diagram illustrating the difference in clear toner page registration jobs generated with the third embodiment and the fourth embodiment of the present invention.

FIG. 27 is a diagram schematically illustrating a DDI function list saved within the RAM.

FIG. 28 is a diagram schematically illustrating a clear page reference list.

FIG. 30 is a diagram schematically illustrating the saved DDI function list according to a fifth embodiment of the present embodiment.

FIG. 31 is a diagram illustrating content of an updated clear page reference list.

FIGS. 35A and 35B are diagrams illustrating a method to embed clear toner drawing information in PDL data according to a sixth embodiment of the present invention.

FIGS. 36A and 36B are diagrams illustrating a method to embed clear toner drawing information in PDL data according to a sixth embodiment of the present invention.

FIG. 37 is a flowchart describing operations of the printer driver according to the sixth embodiment of the present invention.

FIG. 38 is a diagram describing a memory map of a computer-readable storage medium that can be read with the printing control apparatus according to the present invention wherein various types of data processing programs are recorded.

DESCRIPTION OF THE EMBODIMENTS

Figure 1:
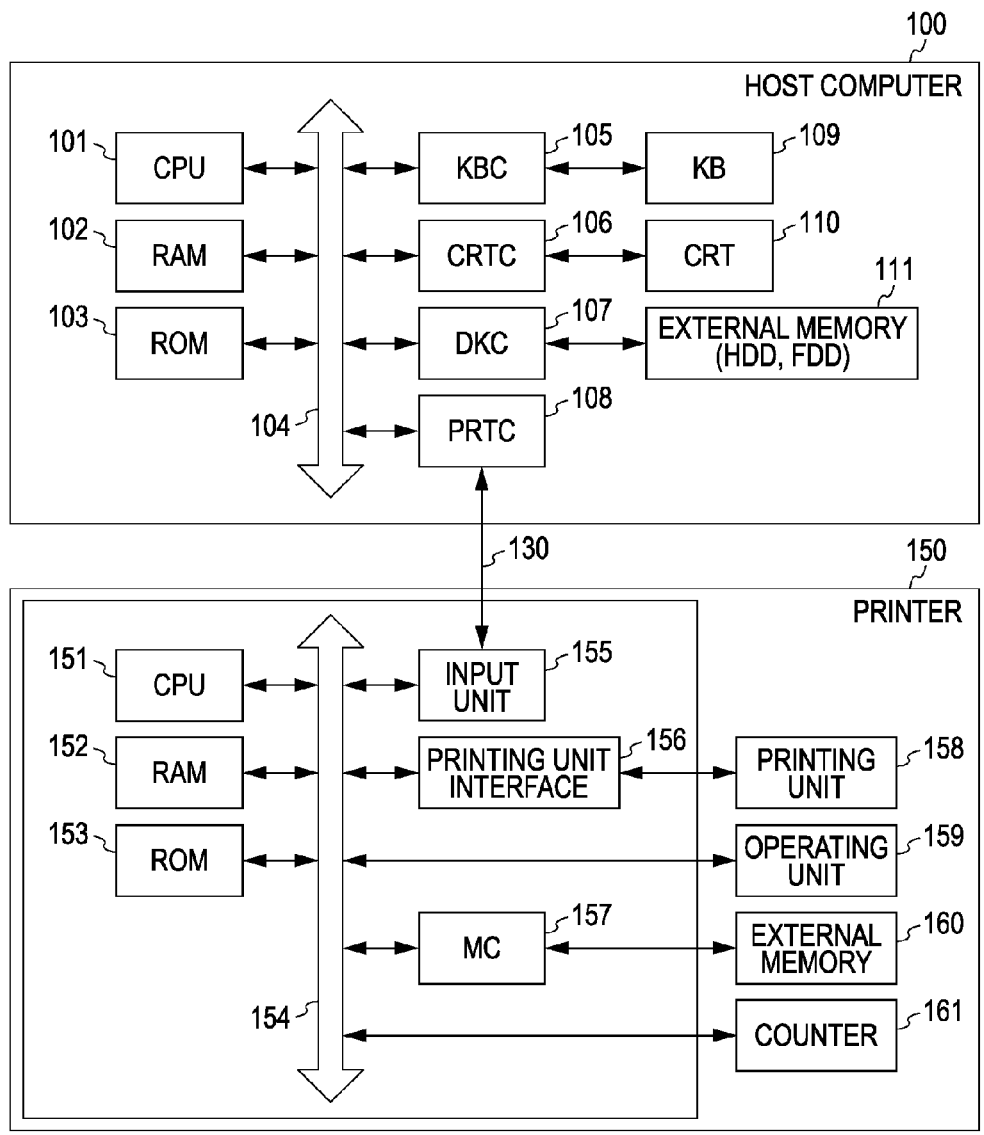
FIG. 1 is a diagram illustrating a configuration of a printing system according to an embodiment of the present invention.

Hereafter, embodiments of the present invention will be described in detail with reference to the appended diagrams. FIG. 1 is a diagram illustrating a configuration of the printing system showing an embodiment of the present invention. In FIG. 1, a host computer 100 has a CPU 101 that executes document processing such as shapes, images, text, charts (including chart calculations and the like) based on a document processing program or the like stored in an external memory 111. The CPU 101 performs overall control of each device connected to a system bus 104.

Also, an operating system program (hereafter, OS) or the like which is a control program of the CPU 101 is stored in ROM 103 and the external memory 111. A RAM 102 functions as main memory, work area, and so forth of the CPU 101.

A keyboard controller (KBC) 105 controls key input from a keyboard 109 and unshown pointing device. A CRT control (CRTC) 106 controls display of the CRT display (CRT) 110.

A disk controller (DKC) 107 controls access between external memory 111 such as a hard disk drive (HDD) and flexible disk (FDD). The external memory 111 stores a boot program, various types of applications, font data, user files, editing files, printer control command generating programs (hereafter printer drivers), and so forth.

A printer controller (PRTC) 108 is connected to the printer 150 via a bi-directional interface 130, and executes communication control processing with the printer 150.

Note that the CPU 101 executes rendering (rasterizing) processing of an outline font to a display information RAM that is set on the RAM 102, for example, enabling WYSIWYG on the CRT 110.

Also, the CPU 101 opens various types of windows registered based on commands instructed with an unshown mouse cursor or the like on the CRT 110, and executes various types of data processing. In the event of executing printing, the user opens a window relating to printing settings, and can perform printing settings and settings for a printing processing method as to a printer driver including the printing mode selection.

The printer 150 is controlled by a CPU 151. The CPU 151 outputs an image signal serving as output information to a printing unit (printer engine) 158 connected via a printing unit interface 156 to the system bus 154 based on the control program stored in the ROM 153 or the control program or the like stored in the external memory 160. Also, a control program or the like of the CPU 151 is stored in the ROM 153. Font data and the like that is used in the event of generating the above-mentioned output information is stored in a font ROM of the ROM 153. In the case of a printer having no external memory 160 such as hard disk, information used on the host computer and the like is stored in the data ROM of the ROM 153.

The CPU 151 enables communication processing with the host computer 100 via the input unit 155, and information within the printer and so forth can be notified to the host computer 100.

The RAM 152 is configured so as to function as main memory, work area, and so forth of the CPU 151, and such that memory capacity can be extended with an option RAM connected to an unshown expansion port. Note that the RAM 152 is used as an output information rendering region, environment data storage region, NVRAM and so forth. The external memory 160 made up of a hard disk drive (HDD), IC card, and so forth controls access with a memory controller (MC) 157.

In addition to the above-described control program, the external memory 160 stores font data, emulation programs, form data, and so forth. Also, 159 denotes an operating panel, and has switches for operations and LED display devices and so forth.

Also, the printer 150 has a counter 161 to count the number of printed sheets for the purpose of accounting. The counter 161 has a color charge counter and clear toner charge counter, and the counting operation of the counter 161 is controlled by the CPU 151. That is to say, along with the execution of the color printing and clear toner printing, the color charge counter and clear toner charge counter are counted up.

Note that the external memory 160 is not limited to one, and an arrangement may be made wherein multiple external memories 160 are provided, and multiple option cards and external memories may be connected which store programs to comprehend printer control languages having differing language systems in addition to built-in fonts. Further, the external memory may have an unshown NVRAM that stores printer mode setting information from the operating panel 159.

Figure 2:
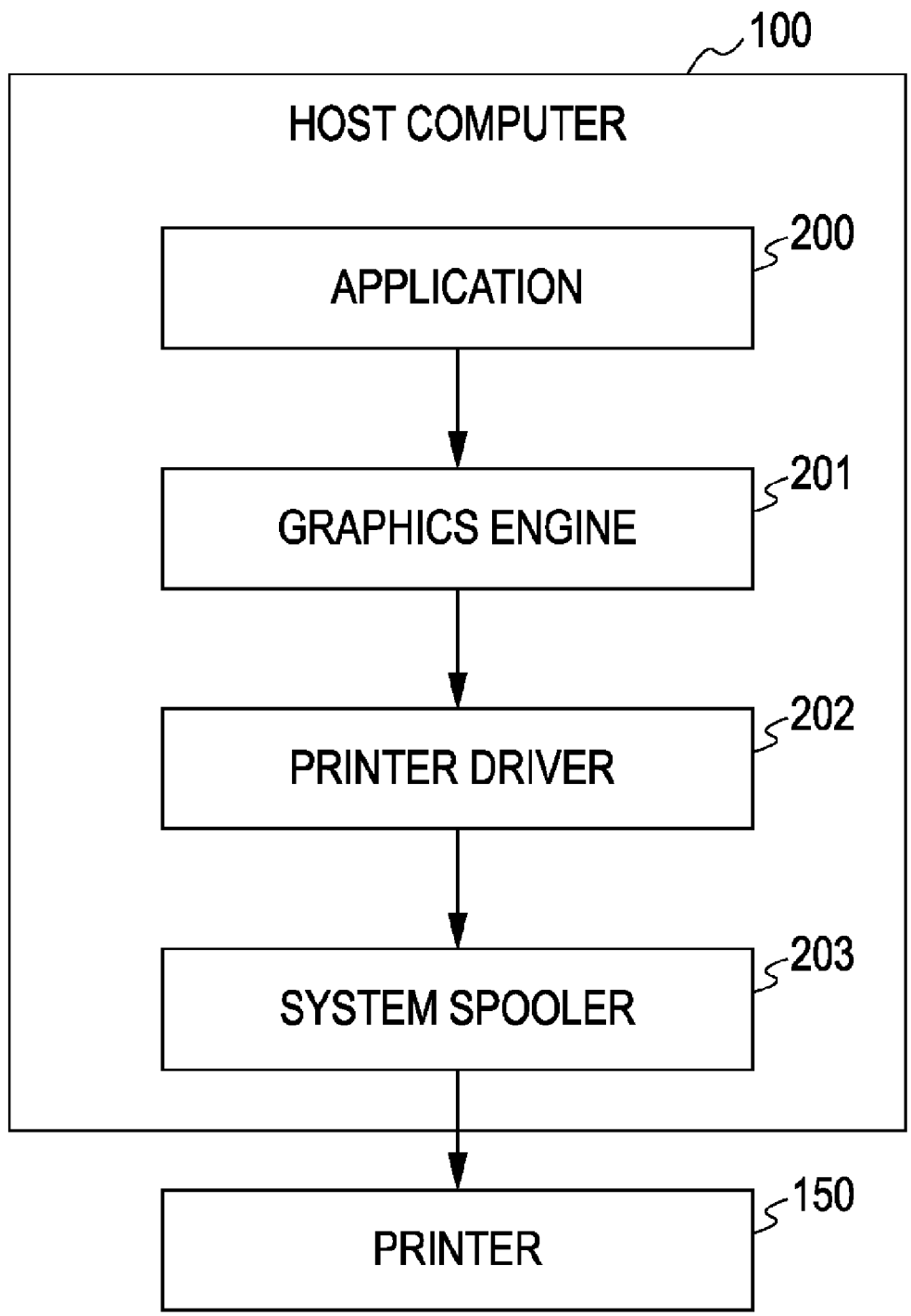
FIG. 2 is a diagram illustrating a software configuration relating to printing processing of the printing system according to an embodiment of the present invention.

FIG. 2 is a diagram showing software confirmation relating to the printing processing of the printing system according to an embodiment of the present invention. As shown in FIG. 2, with the host computer 100, an application 200, graphics engine 201, printer driver 202, and system spooler 203 are saved in an external memory 111. These are loaded in the RAM 102 by instructions from another program using the OS or a program thereof, and are program modules executed with the CPU 101.

Also, the application 200 and printer driver 202 can be added to (installed in) an FDD or unshown CD-ROM of the external memory 111 or the HDD of the external memory 111 via a network. The application stored in the external memory 111 is loaded to the RAM 102 and executed by the CPU 101. In the event of performing printing as to the printer 150 from the application 200, output (drawing) is performed using the graphics engine 201 which can be similarly loaded in the RAM 102 and executed.

The graphics engine 201 similarly loads the printer driver 202 prepared for the printer 150 from the external memory 111 in the RAM 102, and sets the output of the application 200 to the printer driver 202. The graphics engine 201 converts a GDI function received from the application into a DDI function, and outputs the DDI function to the printer driver 202. Note that GDI refers to a Graphic Device Interface, and DDI refers to a Device Driver Interface. Also, a graphics engine is equivalent to a drawing unit of an OS called GDI with Windows® OS.

The printer driver 202 performs conversion into control commands recognizable by the printer, based on the DDI function received from the graphics engine 201, e.g. into PDL (Page Description Language). The converted printer control command is arranged so as to be output as printing data to the printer 150, via the interface 130, by way of the system spooler 203 loaded in the RAM 102 with the OS.

Figure 3:
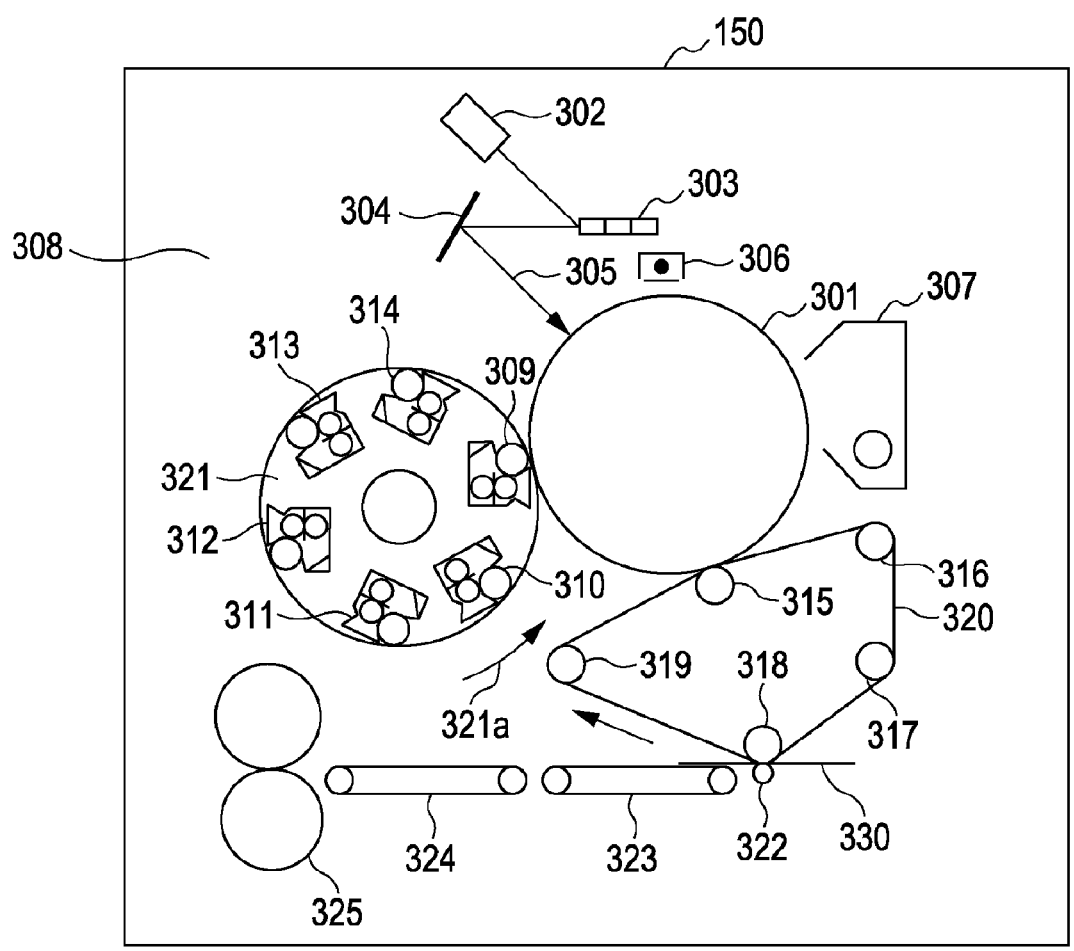
FIG. 3 is a cross-sectional diagram of a color laser printer illustrating an example of a printer.

FIG. 3 is a cross-sectional diagram of the color laser printer showing an example of the printer 150. As shown in FIG. 3, the printer 150 has a drum-shaped electronic photosensitive device serving as an image bearing member, i.e. a photosensitive drum 301.

In the periphery of the photosensitive drum 301 are disposed a charger 306 serving as a charging device, a laser light source 302 serving as an exposure device, and a polygon mirror 303 and mirror 304 to reflect the light image 305 that is irradiated from the laser light source.

Further, a cleaner 307 serving as a cleaning device and a rotational developing device 308 are also disposed in the periphery of the photosensitive drum 301. Also, facing the photosensitive drum 301, an intermediate transfer belt 320 is disposed as an intermediate transfer unit serving as a second image bearing member that is supported by rollers 316, 317, 318, and 319.

The rotational developing device 308 is disposed so as to face the photosensitive drum 301, and has a rotating member that is rotatably supported, i.e. a developing rotary 321. On the developing rotary 321, color toner developing devices for four colors and a special color toner developing device for one color are mounted as multiple developing devices. The color toner developing devices for four colors are a yellow toner developing device 309, magenta toner developing device 310, cyan toner developing device 311, black toner developing device 312, and light black toner developing device 313. Also, the special color toner developing device for one color is a transparent toner (clear toner) developing device 314 for a special color toner for adjusting glossiness.

For example, at the time for forming a full-color image, first, the surface thereof is charged with the charger 306. Next, based on an image signal or the like transferred from the host computer 100 connected to the printer 150, a light image 305 is irradiated from the laser light source 302 to the surface of the charged photosensitive drum 301.

Thus, an electrostatic image (latent image) is formed on the photosensitive drum 301. The latent image herein is developed with a rotational developing device 308. That is to say, the developing rotary 321 is rotated in the direction of the arrow 321a, and a predetermined developing device, i.e. the developing device 309 is moved to a developing portion facing the upper portion of the photosensitive drum 301. By the developing device 308 being operated, a toner image is formed on the photosensitive drum 301.

Thereafter, the toner image formed on the photosensitive drum 301 is transferred onto the intermediate transfer belt 320 with a facing portion (primary transfer unit) with the photosensitive drum 301 and intermediate transfer belt 320. The transfer herein is performed with a primary transfer bias action that is applied to a primary transfer roller 315 serving as a primary transfer device.

By repeating the above actions, a multi-layer toner image is formed on the intermediate transfer belt 320, wherein yellow toner, magenta toner, cyan toner, black toner, light black toner, and transparent toner (clear toner) are sequentially layered.

The multi-layered toner image formed on the intermediate transfer belt 320 is transferred to a recording member 330 with the actions of a secondary transfer bias applied to a secondary transfer roller 322, with a facing portion (secondary transfer unit) with the secondary transfer roller 322 serving as the secondary transfer device and the intermediate transfer belt 320. The recording member 330 is conveyed from an unshown recording member supply unit to the secondary transfer unit, to match the timing that the leading edge of the multi-layered toner image on the intermediate transfer belt 320 is conveyed to the secondary transfer unit.

The recording member 330 whereupon the toner image is transferred is conveyed to the roller fusing unit 325 serving as a fusing device with the conveying belts 323 and 324. The recording member 330 is pressed/heated with the roller fusing unit 325, and the toner image is fused thereupon as a permanent image. Thereafter, the recording member 330 is discharged outside of the device.

Also, the primary transfer remaining toner that remains on the photosensitive drum 301 after the primary transfer process is removed with the cleaner 307. Further, the secondary transfer remaining toner that remains on the intermediate transfer belt 320 after the secondary transfer process is removed with an unshown transfer belt cleaner.

Next, a user interface on the CRT 110 of the printer driver 202 with the printing system according to the present embodiment will be described with reference to FIGS. 4 through 8.

FIG. 4 is a diagram showing a first layer of the user interface with the printer driver 202. In FIG. 4, 401 is a printing setting dialog box, which can be opened from a printing setting screen or the like of a printer folder or application 200 managed with the OS (can be instructed to display). The CPU 101 detecting such display instructions executes the printer driver 202 loaded on the RAM 102 to perform control such that the printing setting dialog box 401 is displayed on the CRT 110.

Note that the arrangement shown in FIG. 4 is a user interface of a page setting sheet 402 which can perform basic printing settings. With the page setting sheet 402, the document size 403 specified with the application and the output sheet size 404 to actually perform printing can be specified. Also, with the page setting sheet 402, the number of copies 412 to be printed, the printing direction 405 such as portrait or landscape, the page layout 406 such as N-up, the enlarge/reduce 407 for freely enlarging/reducing, and the edit stamp 408 for setting the details about the stamp function can be specified.

Further, a user defined sheet can also be created with the user defined sheet button 409. Also, various types of options performed with the printer driver 202, such as page design, overlay, and so forth, can be set by pressing the page options button 410. A return to default button 411 is a button used to return the above-mentioned settings to a default state.

The printer driver 202 generates PDL data based on content specified from the content set in the main user interface 401 and application at the time of printing execution, and sends this to the printer 150.

Figure 5:
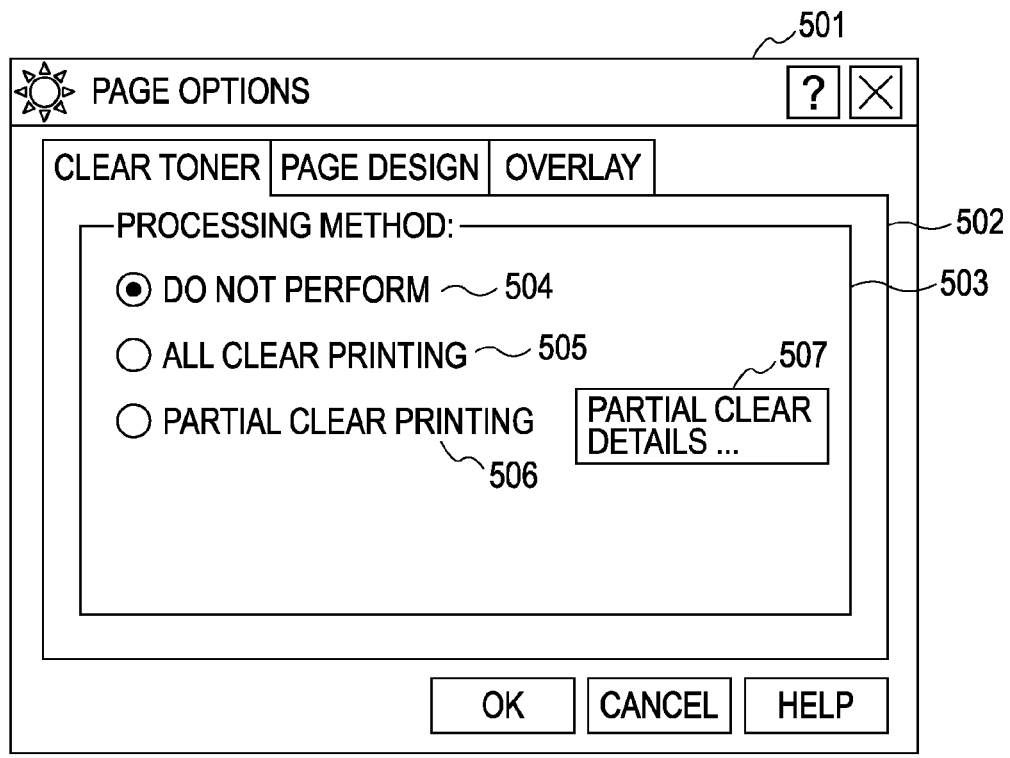
FIG. 5 is a diagram illustrating a user interface of a page option dialog box which a printer driver opens at the time that a page option button shown in FIG. 4 is pressed by a user.

FIG. 5 is a diagram illustrating a user interface of a page options dialog box 501 which the printer driver 202 opens (displays on the CRT 110) at the time that the page options button 410 shown in FIG. 4 is pressed by the user.

With the page options dialog box according to the present embodiment, in addition to a page design setting screen (shown in FIG. 8) and overlay setting screen which are generally used, a clear toner setting screen 502 to set the clear toner usage method exists. The clear toner setting screen 502 will be described below.

The clear toner setting screen 502 has a "processing method" region 503 that can select the processing method thereof. The processing methods are made up of selectable radio buttons of "do not perform" 504, "all clear printing" 505, and "partial clear printing" 506.

In the event that "do not perform" 504 is specified, the printer driver 202 performs processing as a normal color job that does not use clear toner. Also, in the event that "all clear printing" 505 is specified, the printer driver 202 instructs the printer 150 to perform so that all clear printing is performed in addition to the normal color job processing. The all clear printing here indicates processing to coat the entire sheet of the recording sheet 330 evenly with clear toner, in addition to the color toner printing such as CMYK. At this time, the instructions as to the printer 150 may be performed with a PDL command, or may be performed by sending another control command to the printer 150.

In the event that "partial clear printing" 506 is specified, the printer driver 202 performs processing to coat only a portion of the sheet 330 with clear toner in comparison to "all clear printing" which coats the entire sheet 330. In the event of performing partial clear printing, the printer driver 202 controls the "partial clear details" button 507 to further enable specifying of partial clear details.

Figure 6:
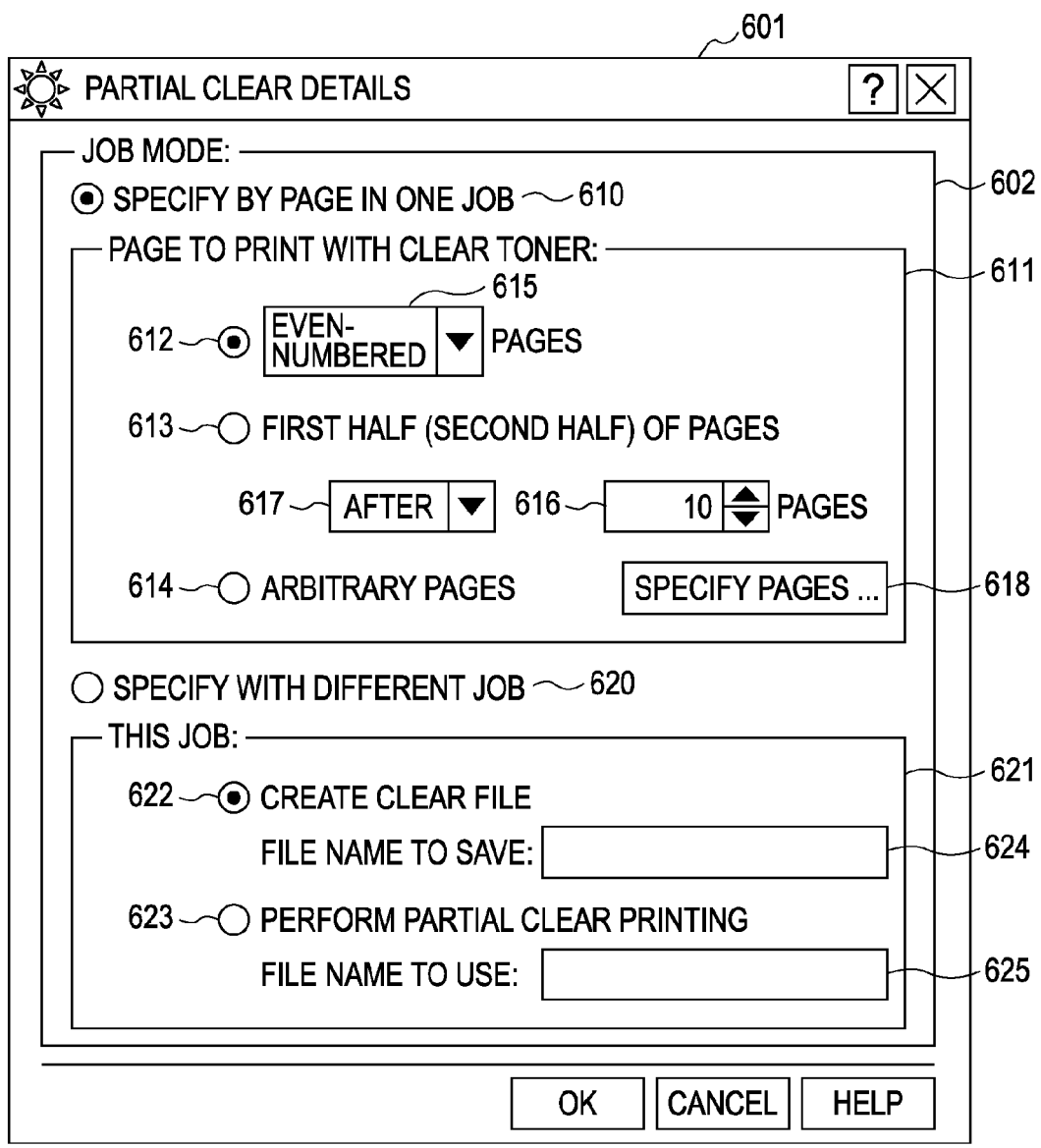
FIG. 6 is a diagram illustrating an example of a user interface of a "partial clear details" dialog box which the printer driver opens at the time that a "partial clear details" shown in FIG. 5 is pressed by the user.

FIG. 6 is a diagram illustrating an example of a user interface of a "partial clear details" dialog box 601 (special color toner page setting screen) which the printer driver 202 opens in the event that a "partial clear details" button 507 shown in FIG. 5 is pressed by the user.

The "partial clear details" dialog box 601 has a "job mode" region 602 to select with which job mode the image to be printed with clear toner is to be specified.

In the event that "specify by page in one job" 610 is selected in the "job mode" region 602, the printer driver 202 specifies the pages to print with clear toner out of the page groups specified as one job by the application 200 at region 611.

With the region shown in 611, multiple specifying methods are prepared. For each of the specifying methods, a description relating to the user interface will be given, but with what sort of layout the drawing data will be printed onto the recording sheet for each page will be described in the explanation in FIG. 9 and thereafter.

First, at 612, which is one of the specifying methods, even numbers and odd numbers are selected in a combo box 615. At the time that even numbered pages are specified, the printer driver 202 changes processing between odd-numbered pages and even-numbered pages, of the multiple pages drawn from the application 200. That is to say, at the time that even-numbered pages are specified, the printer driver 202 instructs the printer 150 to perform printing using color toner to print all of the objects drawn on the odd-numbered pages, and using clear toner for all of the objects drawn on the even-numbered pages. On the other hand, at the time that odd-numbered pages are specified, the printer driver 202 instructs the printer 150 to perform printing using color toner to print all of the objects drawn on the even-numbered pages, and using clear toner for all of the objects drawn on the odd-numbered pages.

In the case that "first half (second half) of pages" 613, which is the second specifying method, is selected, the first half or the second half of the job is specified as clear toner dedicated pages. In this case, the printer driver 202 instructs the printer 150 to perform printing using color toner such as CMYK for all of the objects drawn on the remaining pages not specified as clear toner dedicated pages. On the other hand, the printer driver 202 instructs the printer 150 to perform printing using all clear toner for all of the objects drawn on the pages specified as clear toner dedicated pages.

Note that a user interface 616 to perform page specifying and a user interface 617 showing which of the first half or second half of the job is specified as clear toner dedicated pages are exemplified in FIG. 6. However, a user is not necessarily made to perform page specifying. For example, the printer driver 202 may automatically calculate the number of pages for switching, such as dividing the number of pages by 2 after all of the pages are printed as one job from the application 200.

In the event that "arbitrary pages" 614, which is the third specifying method, is selected, optional/discretionary pages are specified with a dialog box 701 shown in the later-described FIG. 7. Note that the dialog box 701 is displayed with a printer driver 202 at the time that the "specify pages" button 618 is pressed. Also, in the case that "specify with different job" 620 is selected, we presume that the color toner job and clear toner job are specified with different jobs from the application 200.

In the event that the user uses the function of "specify with a different job" 620, the clear toner job is created with the application 200 beforehand and registered in the printer 150. Next, the user creates the color toner job separately with the application 200, and specifies to use the data registered at time of printing. Thus, a method to instruct the printer 150 of layered printing from the printer driver 202 is similar to a currently existing form overlay function.

The user interface 621 is a user interface for the user to select whether to register the current job as a "clear toner job" or "use previously registered clear toner job". With the user interface 621, in the event that "create a clear file" 622 is selected, the user performs registration instructions to the printer 150 with a file name input with "save file name" 624. On the other hand, in the event that "perform partial clear printing" 623 is selected, the user performs printing instructions to the printer 150 so as to print the registered file of the file name input with "user file name" 625 with clear toner layered over the current job. Detailed operations at the time of specifying with different jobs for the registration of the clear toner job and a job using previously registered clear toner job are not directly related to the embodiments of the present invention so will be omitted.

Note that how the printer 150 receiving two types of jobs processes the jobs is content related to embodiments of the present invention so will be described briefly with the description in the later-described FIG. 20.

Figure 7:
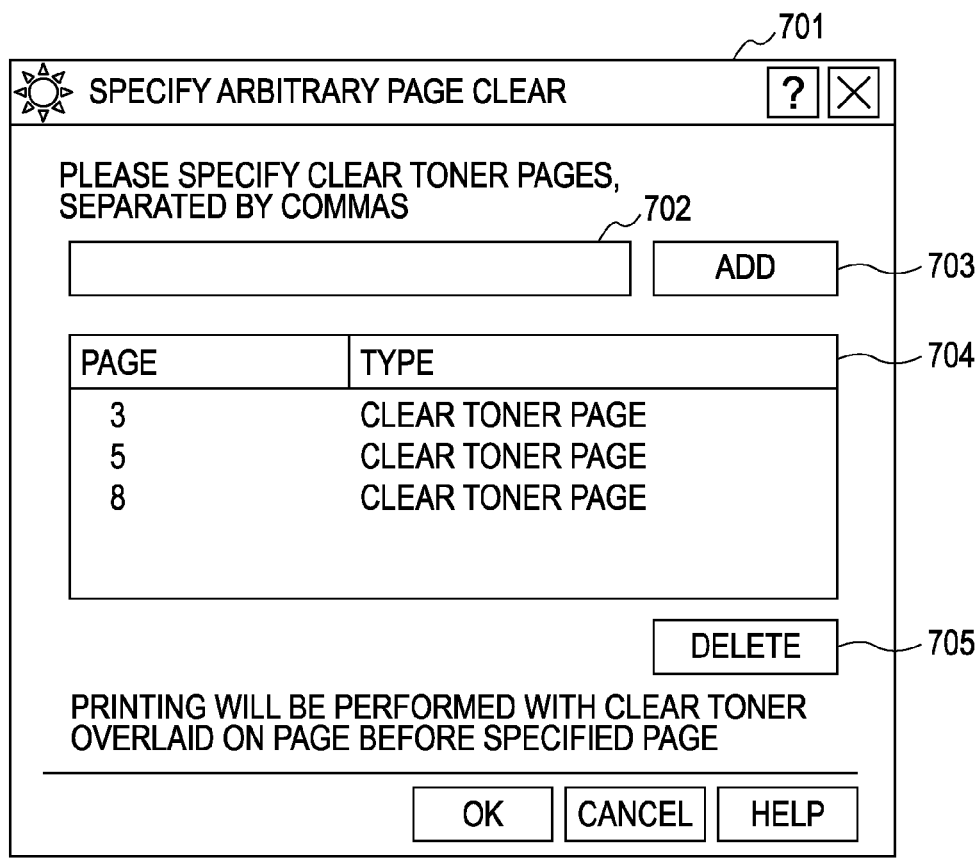
FIG. 7 is a diagram illustrating a user interface which the printer driver opens at the time that "specify pages" buttons shown in FIG. 6 are pressed.

FIG. 7 is a diagram illustrating a user interface which the printer driver 202 opens (displays on the CRT 110) at the time that the "specify pages" button 618 shown in FIG. 6 is pressed.

With the dialog box 701, the user inputs page numbers to be printed with clear toner in an edit box region 702, separated by commas. Upon the "add" button 703 being pressed, the page numbers input in an edit box region 702 are displayed in the list box 704, one row at a time, by the printer driver 202.

Upon a "deleted" button 705 being pressed in the state that a row of a displayed page number is selected, the printer driver 202 deletes the selected row within the list box 704.

With the present embodiment, a page number N that is input in the dialog box 701 is printed with clear toner layered over the color toner printing of page number N−1. Therefore, it is desirable for the printer driver 202 to control with the user interface so that input cannot be made as to "page 1" or "continuously-numbered pages". It is desirable for the page previous to the page thus specified to be a color toner page. Note that an arrangement may be made wherein the page number N input in the dialog box 701 is printed with clear toner so as to be layered on the color toner printing of the page number N+1. In the case of this configuration, it is desirable for the printer driver 202 to control with the user interface so that input cannot be made as to "last page" or "continuously-numbered pages". Also, it is desirable for the one page following the page thus specified to be a page for color toner.

Figure 8:
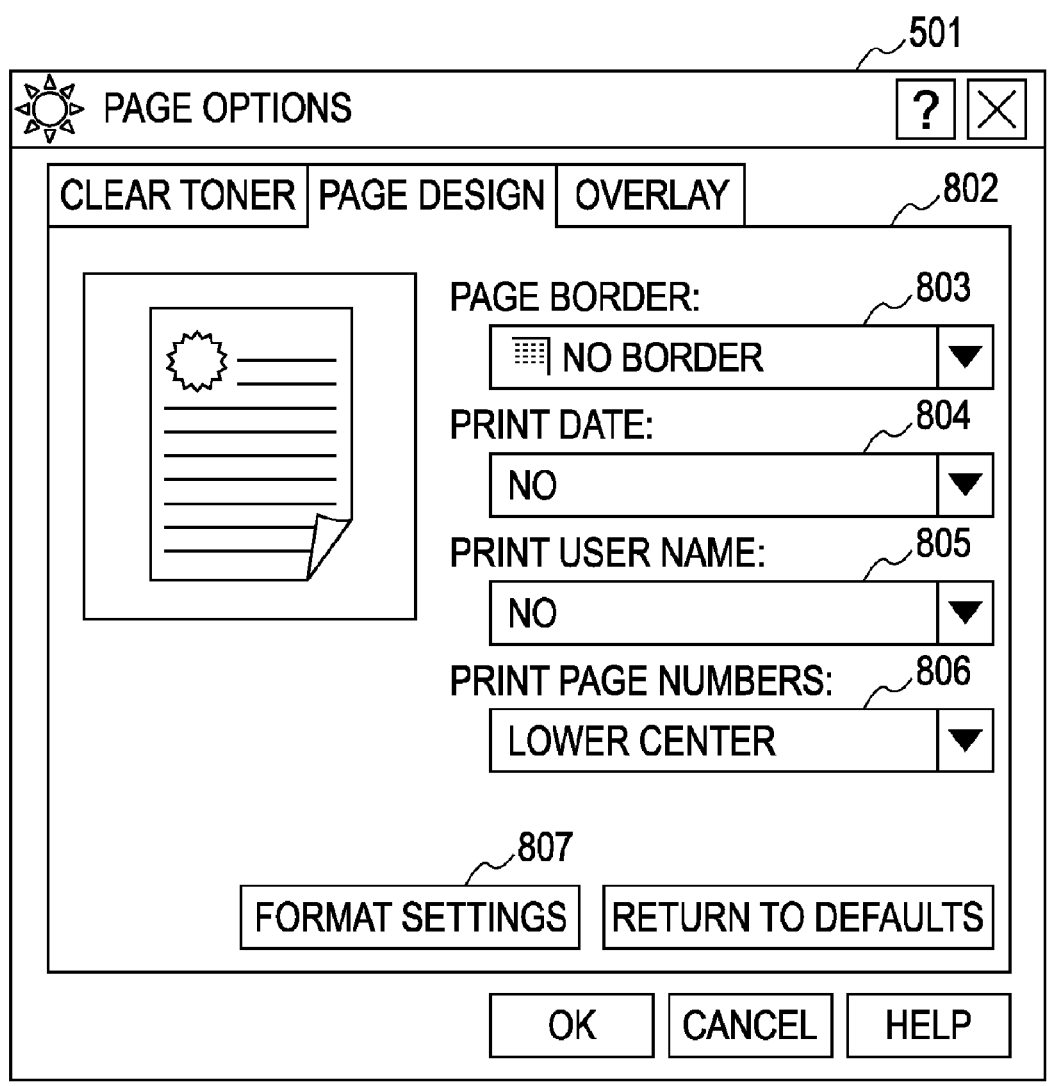
FIG. 8 is a diagram illustrating a user interface of a page option dialog box which the printer driver opens at the time that a page option button shown in FIG. 4 is pressed by a user.

FIG. 8 is a diagram illustrating a user interface of a page option dialog box 501 which the printer driver 202 opens (displayed on the CRT 110) at the time that a page option button 410 shown in FIG. 4 is pressed by a user. Note that with FIG. 8, a setting screen 802 of the page design will be described.

Upon the current page design function being specified, the printer driver 202 adds the drawing objects in the form of adding drawing objects drawn from the application 200. Specifically, upon printing of the page frame, date, user name, and page number being specified with the combo boxes 803, 804, 805, and 806 respectively, the printer driver 202 adds the objects thereof as to the PDL data transmitted to the printer 150 in the event of printing processing.

Figure 9:
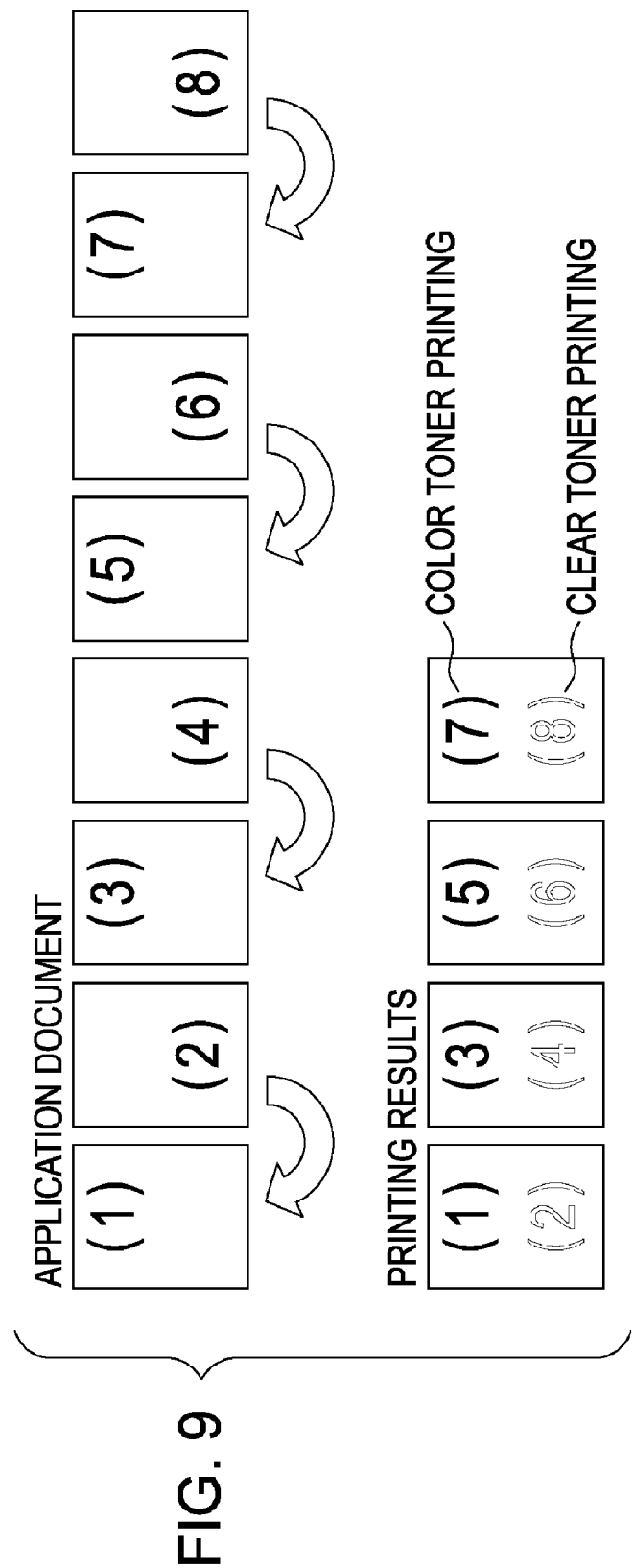
FIG. 9 is a diagram illustrating input to the printer driver and output from the printer at the time that "even pages" is selected in the partial clear details dialog box in FIG. 6.

Page processing according to the present embodiment will be described below with reference to FIGS. 9 through 11. FIG. 9 is a diagram illustrating input to the printer driver 202 and output from the printer 150 at the time that "even pages" 612 is selected in the partial clear details dialog box 601 in FIG. 6. In FIG. 9, the input to the printer driver 202 is shown in the form of an application document, and the output from the printer is shown in the form of printing results.

Of the multiple pages in the application document, in the case of printing even-numbered pages with the clear toner, the printer driver 202 instructs the printer 150 so as to print layering over the previous odd-numbered page, as shown in FIG. 9. That is to say, all of the drawing objects in the second page are replaced with clear toner drawing objects, and then printed with clear toner so as to be layered on the color (CMYK) toner drawing objects on the first page. Consequently, as shown in FIG. 9, a full 8-page application document becomes a full 4-page printing result.

Note that the printing result as to the application document may be realized with any method, as long as the result is as that shown in FIG. 9. That is to say, any configuration may be used as long as the configuration instructs the printer 150 to process even-numbered pages specified as clear toner pages as clear toner pages (special color toner pages) performed with printing using clear toner, process the other pages (odd-numbered pages) as color toner pages performed with printing using color toner, and print the clear toner pages so as to layer the clear toner pages to the same face of the same sheet whereupon the color toner pages are printed. For example, a realizing device to combine two pages into one may combine as one page serving as PDL data within the printer driver 202. Also, the printer 150 may be instructed to process combining into one page with a method different from the PDL such as a print ticket, with the PDL data from the printer driver 202 remaining as two pages. Further, relating to color processing, the clear toner data may be processed as a single color within the printer driver 202, or the data may be transmitted to the printer 150 as multi-color and processing as a single color of clear toner may be performed in the printer 150. Note that details of a method of instructing from the printer driver 202 to the printer 150 will be described later.

Figure 10:
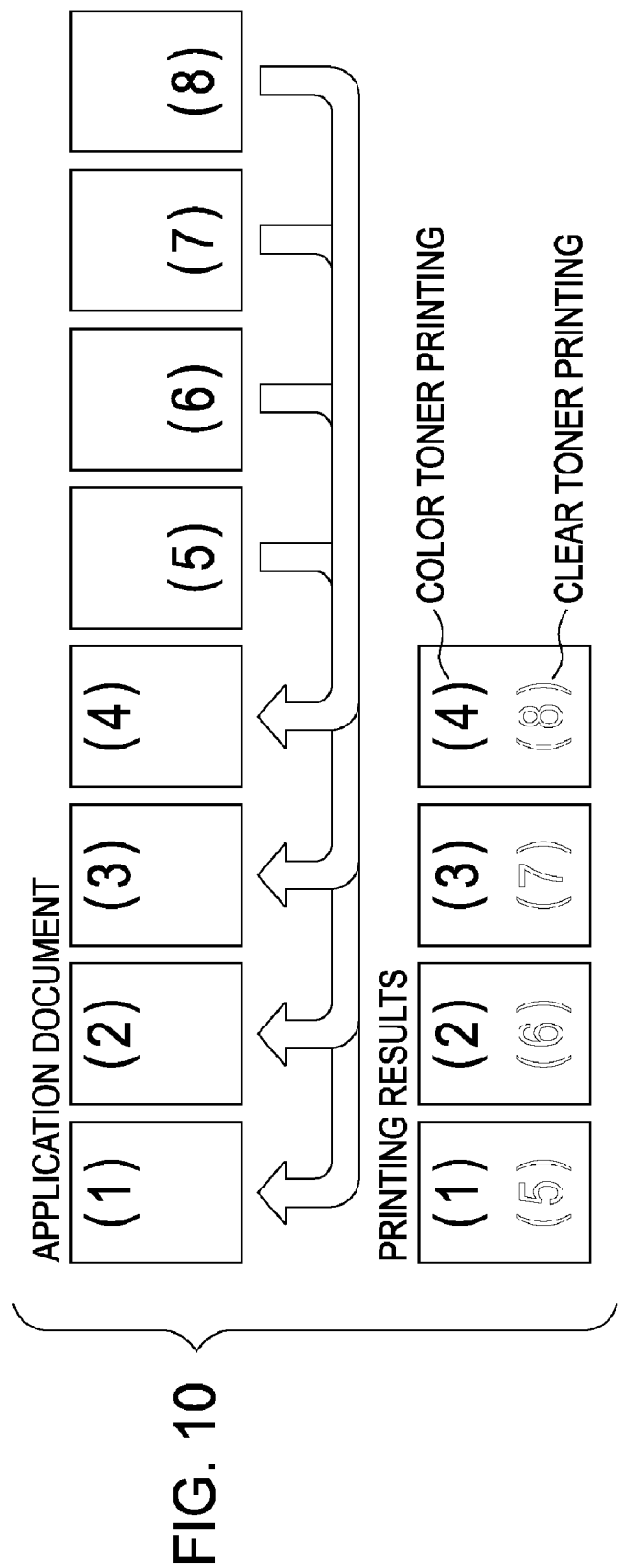
FIG. 10 is a diagram illustrating input to the printer driver and output from the printer at the time that "first (or second) half of pages" is selected in the partial clear details dialog box in FIG. 6.

FIG. 10 is a diagram illustrating input to the printer driver 202 and output from the printer 150 at the time that "first (or second) half of pages" 613 is selected in the partial clear details dialog box 601 in FIG. 6. Similar to FIG. 9, FIG. 10 also indicates the input to the printer driver 202 in the form of an application document, and output from the printer 150 in the form of printing results.

FIG. 10 shows an embodiment at the time that the fifth page and thereafter of an 8-page application document are specified as clear toner printing specified. That is to say, this is an example of a state wherein "first (or second) half of pages" 613 is selected, "5" is selected in the page specifying user interface 616, and "after" is specified in the combo box 617.

The printer driver 202 performs instructions as to the printer 150 to print data from the first page to the fourth page with color (CMYK) toner, and performs instructions as to the printer 150 to print data from the fifth page to the eighth page with clear toner. As a result, as shown in the diagram the data of the fifth page is printed with clear toner so as to be layered on the sheet printed with color (CMYK) toner for the data of the first page. Similarly, the data of the sixth, seventh, and eighth pages is printed with clear toner so as to be layered on the sheets printed with color (CMYK) toner for the data of the second, third, and fourth pages.

Note that as long as the printing results of the application document are as shown in FIG. 10, the realizing means thereof may be any means. In other words, the configuration may be any configuration as long as the printer 150 is instructed to process pages 5 through 8 specified as clear toner pages performed with printing using clear toner, process the other pages (pages 1 through 4) as color toner pages performed with printing using color toner, and print the clear toner pages so as to layer the clear toner pages to the same face of the same sheet whereupon the color toner pages are printed, corresponding to the page sequence. Note that a method of instructing the printer 150 will be described later.

Figure 11:
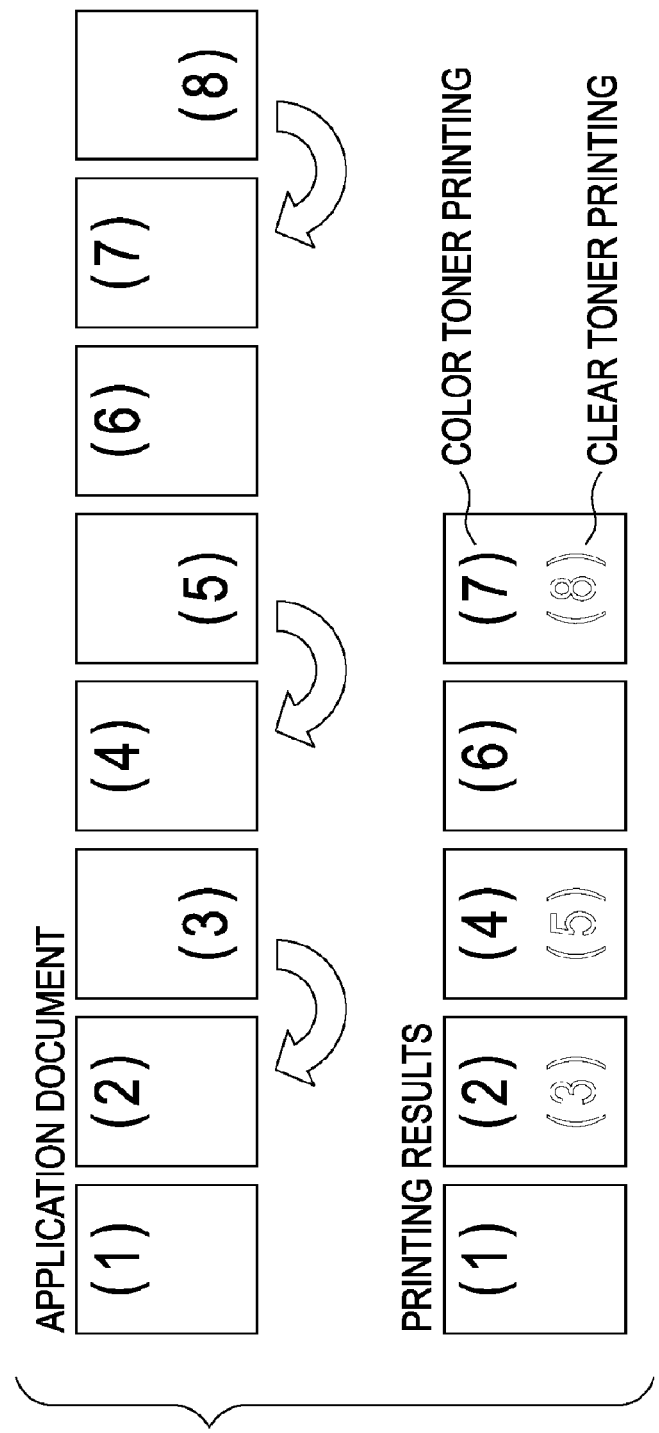
FIG. 11 is a diagram illustrating input to the printer driver and output from the printer at the time that "optional pages" is selected in the partial clear details dialog box in FIG. 6.

FIG. 11 is a diagram illustrating input to the printer driver 202 and output from the printer 150 at the time that "arbitrary pages" 614 is selected in the partial clear details dialog box 601 in FIG. 6. Similar to FIG. 9, FIG. 11 also indicates the input to the printer driver 202 in the form of an application document, and output from the printer 150 in the form of printing results. FIG. 11 shows the embodiment as the time that the user has instructed pages 3, 5, and 8 as clear toner pages, as shown in FIG. 7.

The printer driver 202 instructs the printer 150 to not perform clear toner printing on top of the color (CMYK) toner of the first page, and to perform clear toner printing of the data of the third page on top of the color (CMYK) toner of the second page.

Similarly, the printer driver 202 instructs the printer 150 to perform clear toner printing of the data of the fifth page on top of the color (CMYK) toner of the fourth page. Similarly, the printer driver 202 instructs the printer 150 to not to perform clear toner printing on top of the color (CMYK) toner of the sixth page, and to perform clear toner printing of the data of the eighth page on top of the color (CMYK) toner of the seventh page.

Note that as long as the printing results of the application document are as shown in FIG. 11, the realizing method thereof may be any method. In other words, the configuration may be any configuration as long as the printer 150 is instructed to process pages 3, 5, and 8 specified as clear toner pages performed with printing using clear toner, process the other pages (pages 1, 2, 4, 6, and 7) as color toner pages performed with printing using color toner, and print the above clear toner pages of 3, 5, an 8 so as to layer as the clear toner pages to the same face of the same sheet whereupon the above color toner pages of 2, 4, and 7 are printed. Note that a method of instructing the printer 150 will be described later.

Note that the printer driver 202 may be configured so that the pages specified to print with the clear toner as shown in FIG. 6 are fixed as one of even-numbered pages, odd-numbered pages, first half of pages, or second half of pages. In the case of such a configuration, the printer driver 202 is configured so as to process the above-mentioned fixed-specified pages (one of even-numbered pages, odd-numbered pages, first half of pages, or second half of pages) as clear toner pages performing printing using clear toner.

Thus, as shown in FIGS. 9 through 11, the user can select from multiple selection branches that which can readily create application data.

Figure 12:
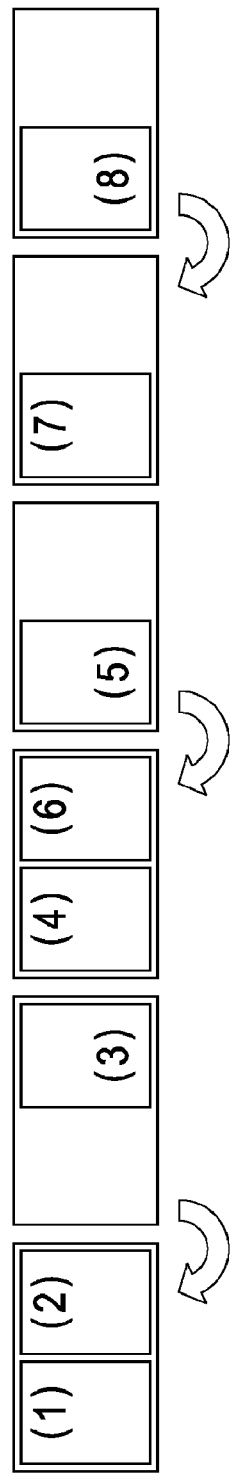
FIG. 12 is a diagram illustrating an operation at the time that 2-up specifying is performed by the user with the printer driver, with the embodiment of the optional page specifying (specifying pages 3, 5, 8) shown in FIG. 11.

Operations in the event of combining other functions of the printer driver 202, with an embodiment of the arbitrary/optional page specifying shown in FIG. 11, will be described with reference to FIGS. 12 through 15. FIG. 12 is a diagram illustrating an operation at the time that 2-up specifying is performed by the user with the printer driver 202, with the embodiment of the optional page specifying (specifying pages 3, 5, 8) shown in FIG. 11.

As shown with the printing results in FIG. 11, the data of the first page has no clear toner data, but the data of the second page has to print the data of the third page with clear toner. Therefore, in the event of performing 2-up, the data of the first and second pages are set as a page layout of 2-up. Page layout such as shown in FIG. 12 is performed so that the data of the third page exactly layers over the data of the second page, and clear toner printing specifying is performed.

Also, the data of the fifth page is data to print with clear toner, so as shown in FIG. 12, the data of the fourth page and the data of the sixth page is set as 2-up on the same sheet. Page layout is performed so that the data of the fifth page exactly layers over the data of the fourth page, and clear toner printing specifying is performed. Consequently, the printer driver 202 performs specifying that is the same as the case of specifying clear toner printing of pages 2, 4, and 6 of full 6 pages worth of data, such as shown in FIG. 12.

Now, a 2-up page layout sequence at the time of page specifying with the list box 704 in the "specify clearing optional pages" dialog box 701 in FIG. 7 will be described in detail. For the sake of simplicity, let us assume that control is performed so as to not enable specifying the optional pages as "page 1" or "continuously-numbered pages", as described in the description of FIG. 7.

First, the printer driver 202 renumbers all of the pages from the logical page number 1. At this time the pages specified in the list box 704 are skipped and the page numbers are renumbered.

Next, the printer driver 202 uses the newly numbered logical page numbers to perform a normal 2-up page layout as to the physical pages.

Next, for each page specified with the list box 704, the printer driver 202 looks up the logical page numbers assigned to the previous page of the page thereof. The printer driver 202 searches the physical page where the page thereof is laid out, and inserts one page worth of a physical page for clear toner after the page thereof. Note that in the event that a physical page for clear toner is already inserted, the printer driver 202 does not perform inserting of a physical page for clear toner.

Subsequently, the printer driver 202 lays out each page specified with the list box 704 with a 2-up page layout on the inserted physical pages for clear toner. The printer driver 202 at this time performs 2-up processing so that the physical page is layered on top of the logical page as specified by the user, and the portions having no clear toner pages do not perform drawing.

The printer driver 202 performs "specify clearing optional pages" processing again as to a job of the new physical pages thus created, thereby realizing 2-up. In this event, the physical pages for clear toner inserted in the above sequence as optional pages specifying clear toner printing are specified. In the example shown in FIG. 12, pages 2, 4, and 6 of a total of six pages worth of data are specified for clear toner printing.

Note that description is made here with 2-up as an example, but any N-up layout printing is applicable that lays out N (two or more) pages on the same face of the same sheet and prints.

As shown above, in the case that N-up printing is specified, the printer driver 202 performs controls to lay out the color toner pages on the printing face of the sheet with N-up, while laying out the clear toner pages corresponding to the layout of the color toner pages to be printed that are layered with the clear toner pages.

Figure 13:
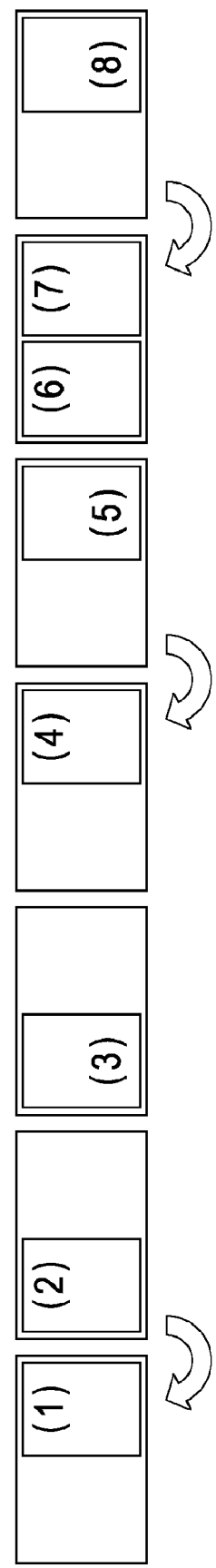
FIG. 13 is a diagram illustrating an operation at the time that specifying for saddle-stitch binding printing is performed by the user with the printer driver, with the embodiment of the optional page specifying (specifying pages 3, 5, 8) shown in FIG. 11.

FIG. 13 is a diagram illustrating an operation at the time that specifying for saddle-stitch binding printing is performed by the user with the printer driver 202, with the embodiment of the optional page specifying (specifying pages 3, 5, 8) shown in FIG. 11. FIG. 13 is similar to the 2-up example shown in FIG. 12 from the point that the data of the third page is layered over the data of the second page precisely, and the data of the fifth page is layered over the data of the fourth page precisely.

Consequently, the printer driver 202 performs the same specifying as to the printer 150 as in the case of specifying clear toner printing for pages 3, 5, and 7 to the data of all seven pages, as shown in FIG. 13.

As shown above, in the case that saddle-stitch binding printing is specified, the printer driver 202 performs control to lay out the color toner pages so as to perform saddle-stitch binding printing on both faces of the sheet, and lay out the clear toner pages to correspond to the layout of the color toner pages that are layered with the clear toner pages and printed.

Figure 14:
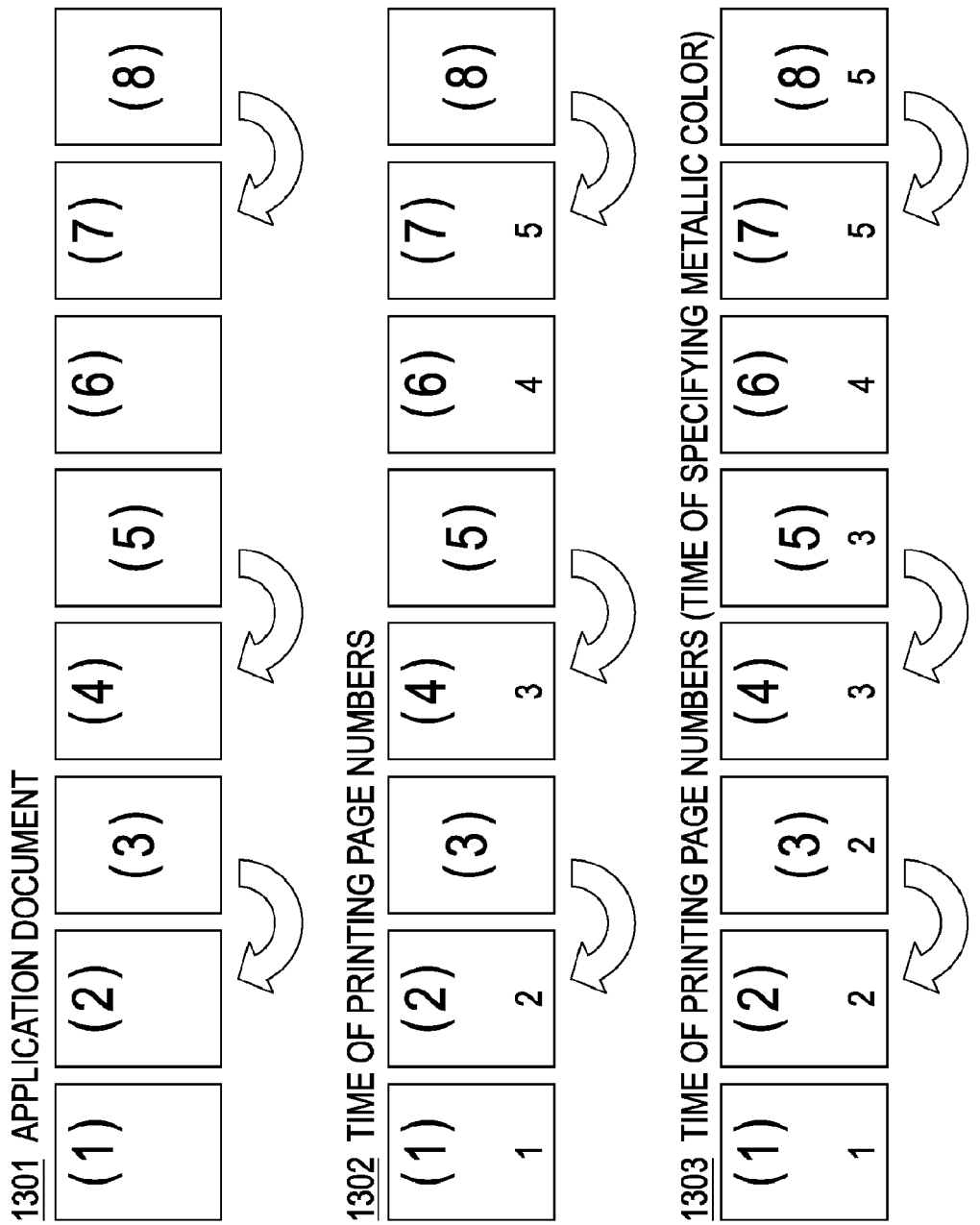
FIG. 14 is a diagram illustrating an operation with the printer driver at the time that "print page numbers" is specified as "lower center" on a "page design" setting screen of the "page options" dialog box illustrated in FIG. 8.

FIG. 14 is a diagram illustrating an operation with the printer driver 202 at the time that "print page numbers" 806 is specified as "lower center" on a "page design" setting screen 802 of the "page options" dialog box 501 illustrated in FIG. 8.

The third, fifth, and eighth pages of the application document 1301 are clear toner data layered over the previous second, fourth, and seventh pages, whereby the printer driver 202 skips such pages and numbers the pages.

Consequently, the printer driver 202 adds the drawing data of the page number "3" to the fourth page of the application document to the PDL data, as shown in the time of page number printing 1302. Also, the printer driver 202 adds the drawing data of the page number "4" to the sixth page of the application document to the PDL data. Further, the printer driver 202 adds the drawing data of the page number "5" to the seventh page of the application document to the PDL data.

Thus, in the event that a metallic color (page number having gloss) is specified with the "font settings" 807, the printer driver 202 processes to add a page number to the color toner page, and also as shown with the time of page number printing (time of specifying metallic color) 1303, controls to add a page number as to the clear toner page, corresponding to the page number added to the color toner page for printing layered with the clear toner page. Consequently, page number output having the effect of a reflective surface (page number having gloss) can be obtained.

Figure 15:
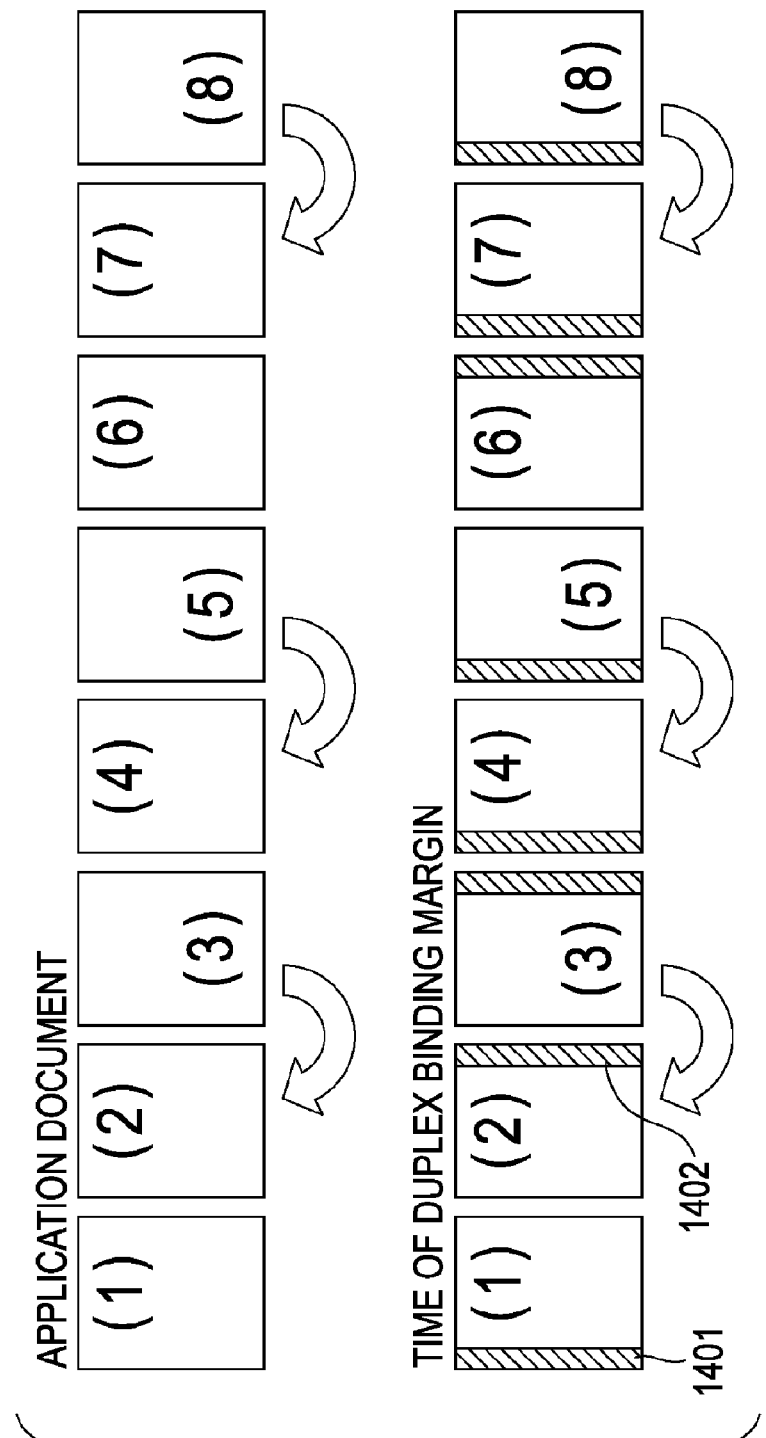
FIG. 15 is a diagram illustrating an operation at the time that blank margin creation is performed with the printer driver for the binding margin (duplex binding margin printing) at the time of specifying duplex printing.

FIG. 15 is a diagram illustrating an operation at the time that blank margin creation is performed with the printer driver 202 for the binding margin (duplex binding margin printing) at the time of specifying duplex printing.

Normally, the binding margin at the time of specifying duplex printing has an appropriate blank margin created on each edge portion according to the printing face. That is to say, in the case that the odd-numbered pages corresponding to the front face is to have a blank margin created on the left edge portion, the even-numbered pages corresponding to the back face thereof have a blank margin created on the right edge portion. With the example shown in FIG. 15, the clear toner pages of 3, 5, and 8 are to be layered over pages 2, 4, and 7, whereby the printer driver 202 creates a blank margin 1401 on the left edge portion of pages 1, 4, 5, 7, and 8, and creates a blank margin 1402 on the right edge portion of pages 2, 3, and 6. That is to say, the blank margins on optional pages are determined depending on whether the value subtracting the number of clear toner pages specified before such page from the number of pages is an even number or an odd number.

Thus, in the case that duplex saddle-stitch binding printing is specified, the printer driver 202 processes so as to create a blank margin on each edge portion according to the printing face as to the color toner page, and controls to create a blank margin on the clear toner page, corresponding to the blank margin created for the color toner page that is to be layered over the clear toner page and printed.

Figure 16A:
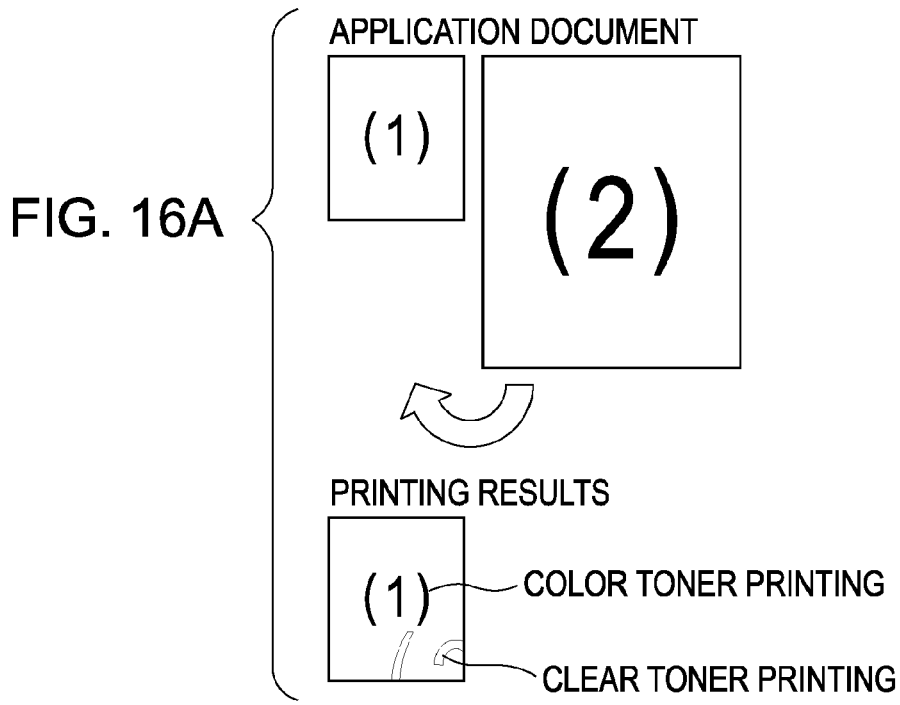
FIGS. 16A and 16B are diagrams illustrating operations in the case that sheet size for page data for color toner and for page data for clear toner to be layered thereupon differs.
Figure 16B:
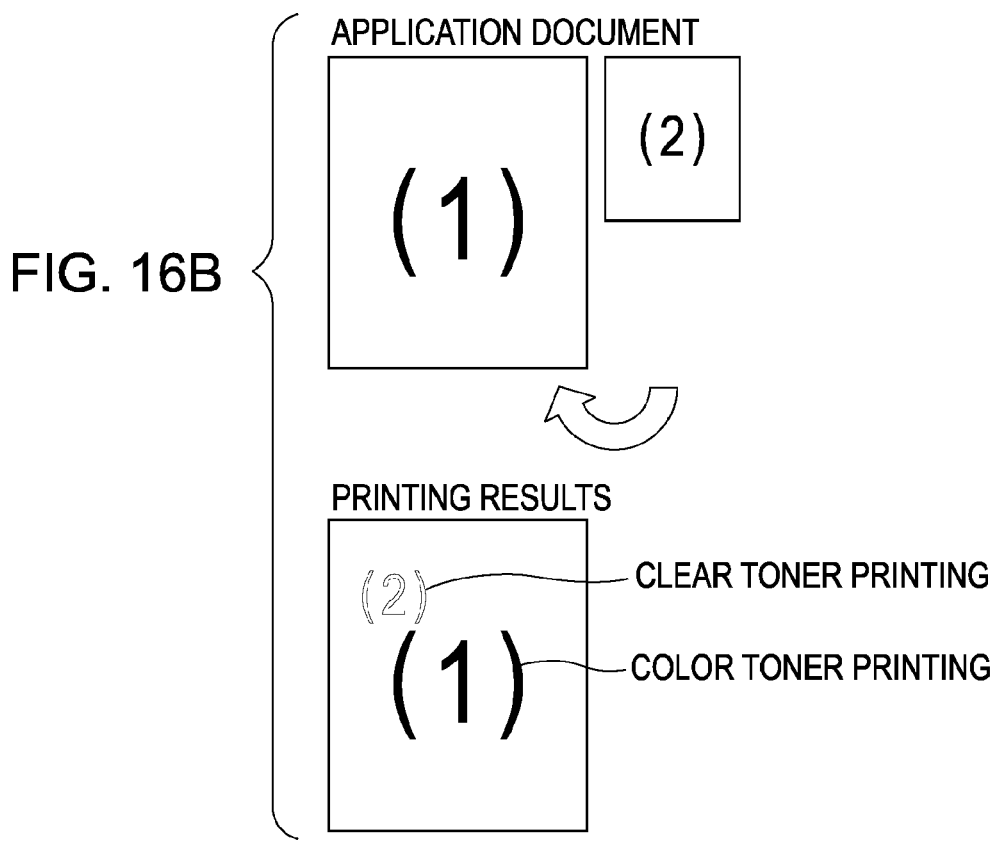

FIGS. 16A and 16B are diagrams illustrating operations in the case that sheet size for page data for color toner and for page data for clear toner to be layered thereupon differs. As shown in FIG. 16A, in the case that the size of the clear toner page data is larger, the printer driver 202 cuts off the drawing data by the amount protruding with the upper left as an origin point, and prints, as shown in the printing results. Also, as shown in FIG. 16B, in the case that the size of the clear toner page data is smaller, the printer driver 202 layers and prints with the upper left as the origin point, as shown in the printing results.

An example of a job creating method of the printer driver 202 according to the first embodiment of the present invention will be described with reference to FIGS. 17 and 18. Similar to the above description, as long as the printing results as to the application document is as the printing results as shown in FIGS. 9, 10, and 11, the realizing method thereof may be any method.

Figure 17A:
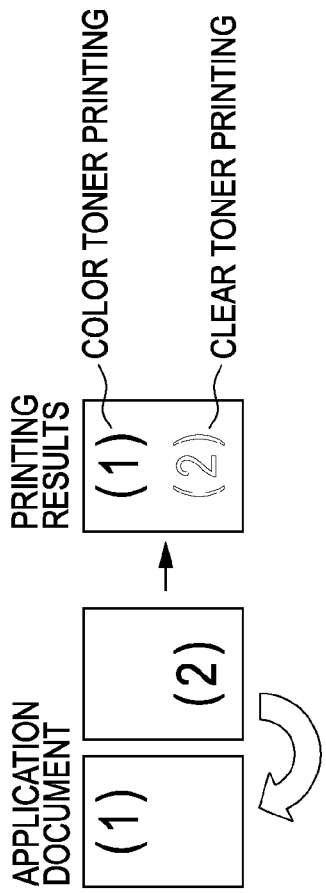
FIGS. 17A and 17B are diagrams illustrating an example of a job creating method of the printer driver.
Figure 17B:
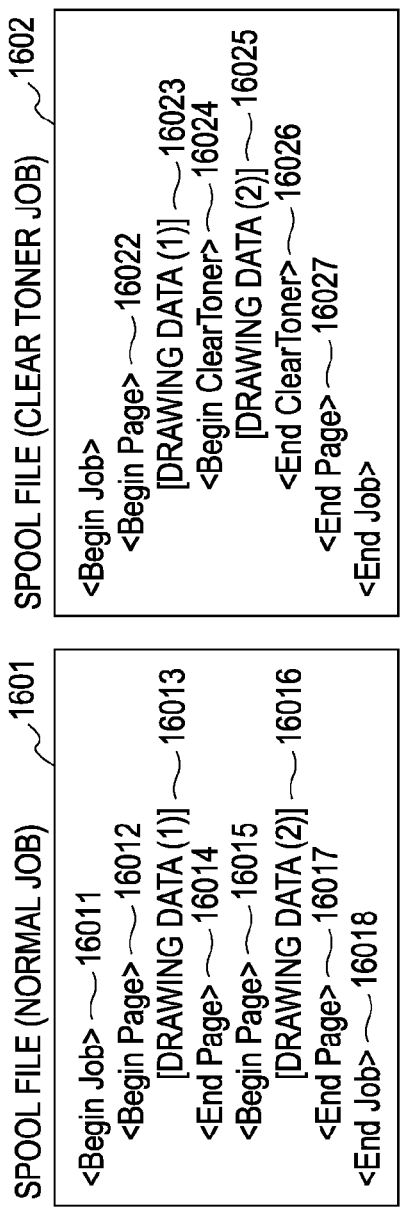
Figure 18:
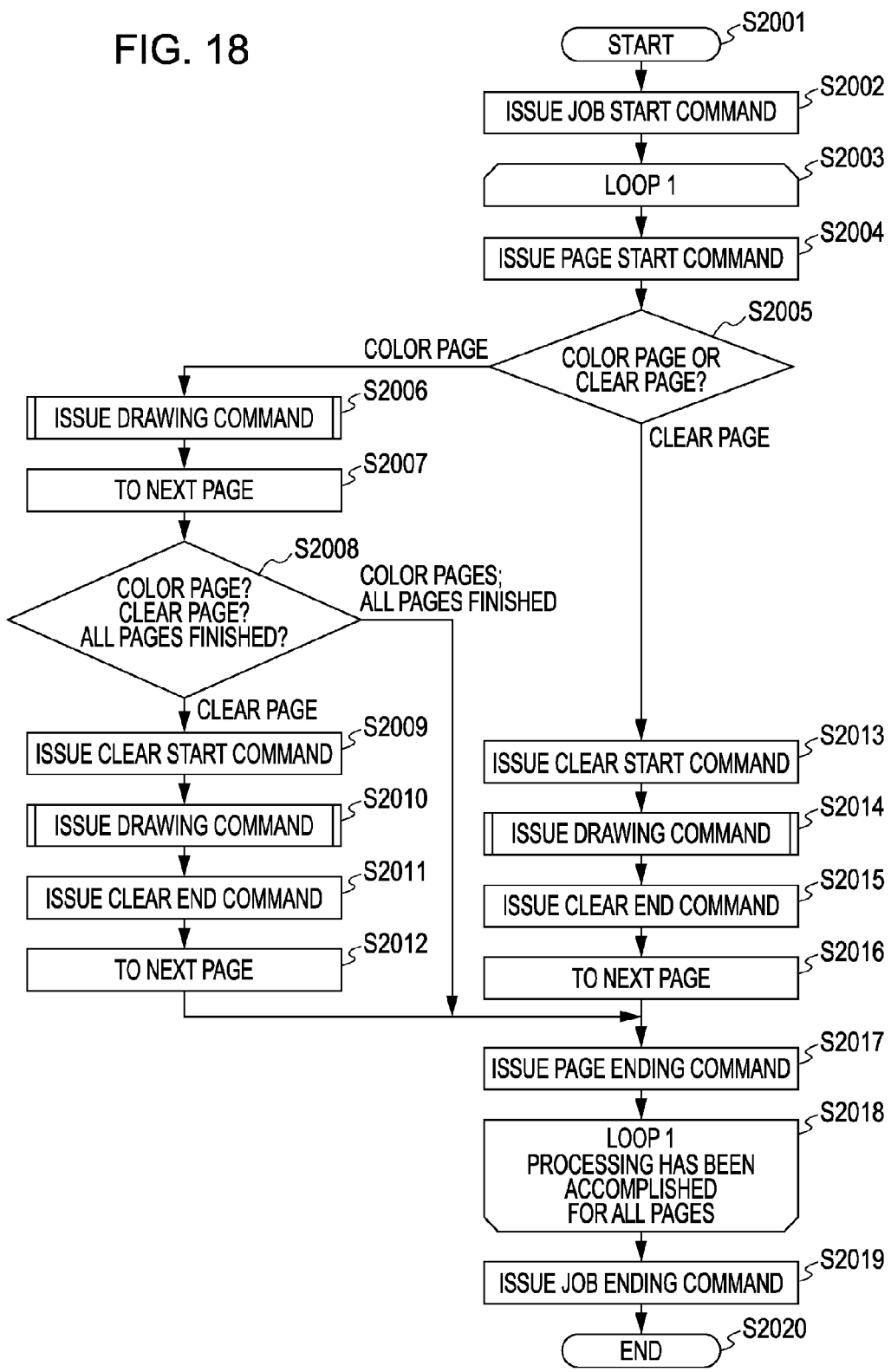
FIG. 18 is a flowchart describing an example of operations of the printer driver.

FIGS. 17A and 17B are diagrams illustrating an example of a job creating method of the printer driver 202. Note that FIG. 17A shows an example of the application document and printing results in Example 1. Also, FIG. 17B shows an overview of PDL data in a spool file that the printer driver 202 outputs as to the printer 150. In FIG. 17B, 1601 shows a spool file at the time of issuing the application document in FIG. 17A as a normal job without using embodiments of the present invention.

A job is surrounded by two commands of 16011 and 16018. Further 16012 and 16014 indicate the start and end of the first page, and a drawing command for the first page is stored therebetween. Similarly, 16015 and 16017 indicate the start and end of the second page, and a drawing command for the second page is stored therebetween. The drawing data (1) 16013 and drawing data (2) 16016 each are surrounded by separate commands, so are each output as drawing data for separate pages.

On the other hand, 1602 in FIG. 17B indicates a spool file of the job issued according to an embodiment of the present invention. With 1602 in FIG. 17B, the drawing data (1) 16023 and drawing data (2) 16025 are both surrounded by one 16022 and 16027. This indicates that the type of toner differs but both are to be printed on the same page.

The drawing data of the first page is the same layout as normal for the color toner data, but the drawing data (2) 16025 of the second page is all laid out between the 16024 and 16026. Upon receiving the job, the printer 150 uses color toner to print the drawing data not surrounded, and prints the surrounded drawing data using clear toner.

Also, in the case of printing with color toner, the printer 150 counts up the color toner printing charge counter, and in the case of printing with clear toner, the printer 150 counts up the clear toner printing charge counter.

Thus, with the present embodiment, the printer driver 202 performs work to convert two pages worth of application document into one page worth of PDL data. That is to say, with the present embodiment, within one page of printing instructions to instruct printing to the printer 150, drawing instructions for color pages and drawing instructions for clear pages are included, and the printer 150 is instructed to layer the clear page as to the same face of the same sheet to print the color page. Note that a two-page document is exemplified for simplicity, but of the multiple pages of the application document, which two pages to combine into one page is as described above.

Next, the operations of the printer driver 202 according to the present embodiment are described with reference to the flowchart in FIG. 18. FIG. 18 is a flowchart describing an example of operations of the printer driver 202. That is to say, the functions shown in the present flowchart are realized by the CPU 101 loading in the RAM 102 and executing the printer driver program recorded in the external memory 111.

Upon the processing in the present flowchart (S2001) starting, the printer driver 202 executed with the CPU 101 (hereafter simply called printer driver 202) first issues a job start command (S2002).

Next, the printer driver 202 controls steps S2004 through S2017 as to all of the pages drawn from the application 200 so as to be repeated (LOOP 1: S2003, S2018).

First, in step S2004, the printer driver 202 issues a page start command.

Next in step S2005, the printer driver 202 determines whether the page to be processed is a color toner page or a clear toner page. The method of determining is to determine based on the specified page in the "page to print with clear toner" region 611 of the "partial clear details" dialog box 601 in FIG. 6.

In the case of determining in step S2005 that the page to be processed is a color page, the printer driver 202 converts the object to be drawn from the application 200 into PDL in step S2006, and issues a normal drawing command.

Upon the issuing of all of the drawing commands within a page ending, the printer driver 202 shifts focus to the next page (S2007).

Next, in step S2008, the printer driver 202 confirms whether or not the page to be processed is a color page or clear page, or whether all pages have ended.

In the case determination is made in step S2008 that the page to be processed is a color page, or that all pages are ended, the printer driver 202 skips the processing until step S2017, and issues a page end command.

On the other hand, in the case determination is made in step S2008 that the page to be processed is a clear page, the printer driver 202 performs the processing in steps S2009 through S2012.

In step S2009, the printer driver 202 issues a clear start command, and declares that the drawing commands from here on out will instruct printing with the clear toner.

In step S2010, the printer driver 202 converts the objects drawn from the application 200 as to the page to be processed all into PDL, and issues a drawing command.

Upon all of the drawing commands of the pages to be processed being issued, in step S2011 the printer driver 202 issues a clear end command, and shifts the page to be processed to the next page (S2012).

The color toner drawing data within the color pages and the clear toner drawing data are all formed as commands, whereby in step S2017 the printer driver 202 issues a page end command.

On the other hand, in the case determination is made in step S2005 that the page to be process is a clear page, the printer driver 202 issues a clear start command first, since the page there becomes a page having no color toner (S2013).

Next, in step S2014 the printer driver 202 converts the objects drawn from the application 200 all into PDL and issues a drawing command.

Upon the issuing of a drawing command ending, in step S2015 the printer driver 202 issues the clear end command and shifts the focus to the next page (S2016). Further, in step S2017 the printer driver 202 issues a page end command.

In the case determination is made in step S2003 that the processing in steps S2004 through S2017 has been repeated for all the pages, the printer driver 202 advances the processing to step S2019, issues a job end command, and ends the job (S2020).

With such a sequence, the printer driver 202 creates data such as shown in FIG. 17B, and instructs printing using clear toner as to the printer 150.

Note that the various commands used here are only example, and in an actual case the commands can be freely modified to correspond to the system.

A second embodiment of the present invention will be described below with reference to FIGS. 19, 20, and 21. In the above-described first embodiment, printing instructions are performed as to the printer 150 for one job, whereas the second embodiment differs in processing method in that printing instructions are performed as to the printer 150 for two jobs. That is to say, with the second embodiment, the drawing specified with one job from the application 200 is divided into two jobs of a color toner job and clear toner job within the printer driver 202.

The present embodiment requires a device to receive a job creating a clear file within the printer 150 (clear toner page registration job) and a job using the specified clear file to perform partial clear printing (color toner page job). This assumes that the device is similar to that of the time wherein "specify with a different job" 620 in FIG. 6 is performed. The operation details within the printer in the event of receiving these jobs are omitted.

Figure 19:
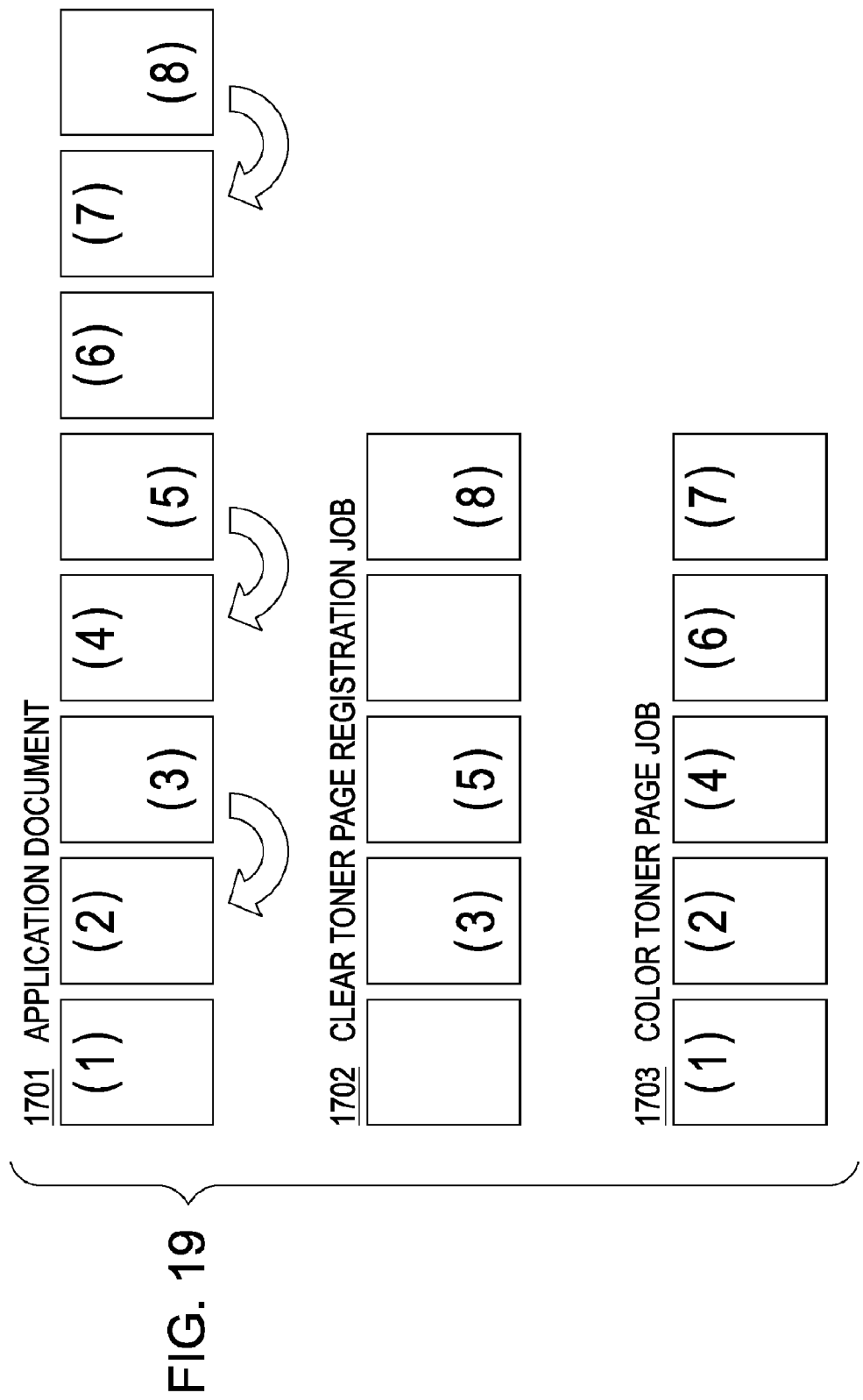
FIG. 19 is a diagram schematically illustrating the application document and the page output of a clear toner page registration job and color toner page job which the printer driver issues as to the printer.

FIG. 19 is a diagram schematically illustrating the application document and the page output of a clear toner page registration job and color toner page job which the printer driver 202 issues to the printer 150. In FIG. 19, 1701 denotes an application document, 1702 denotes a clear toner page registration job to form-register the clear toner page, and 1703 denotes a color toner page job. Note that the example of the application document 1701 is the same as that used in FIG. 11.

Figure 20:
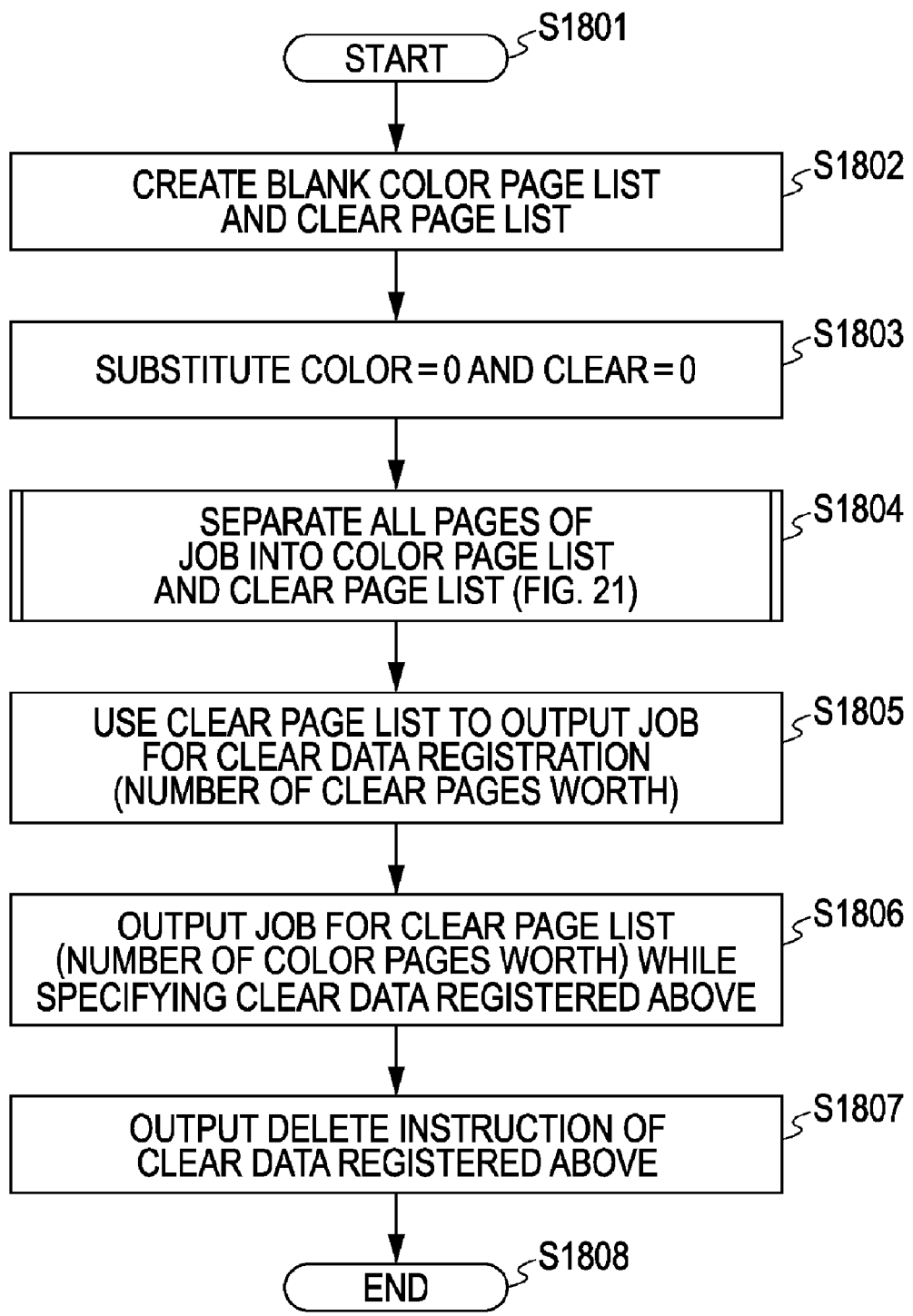
FIG. 20 is a flowchart describing how the printer driver divides and outputs the clear toner page registration job and color toner page job according to a second embodiment of the present invention.
Figure 21:
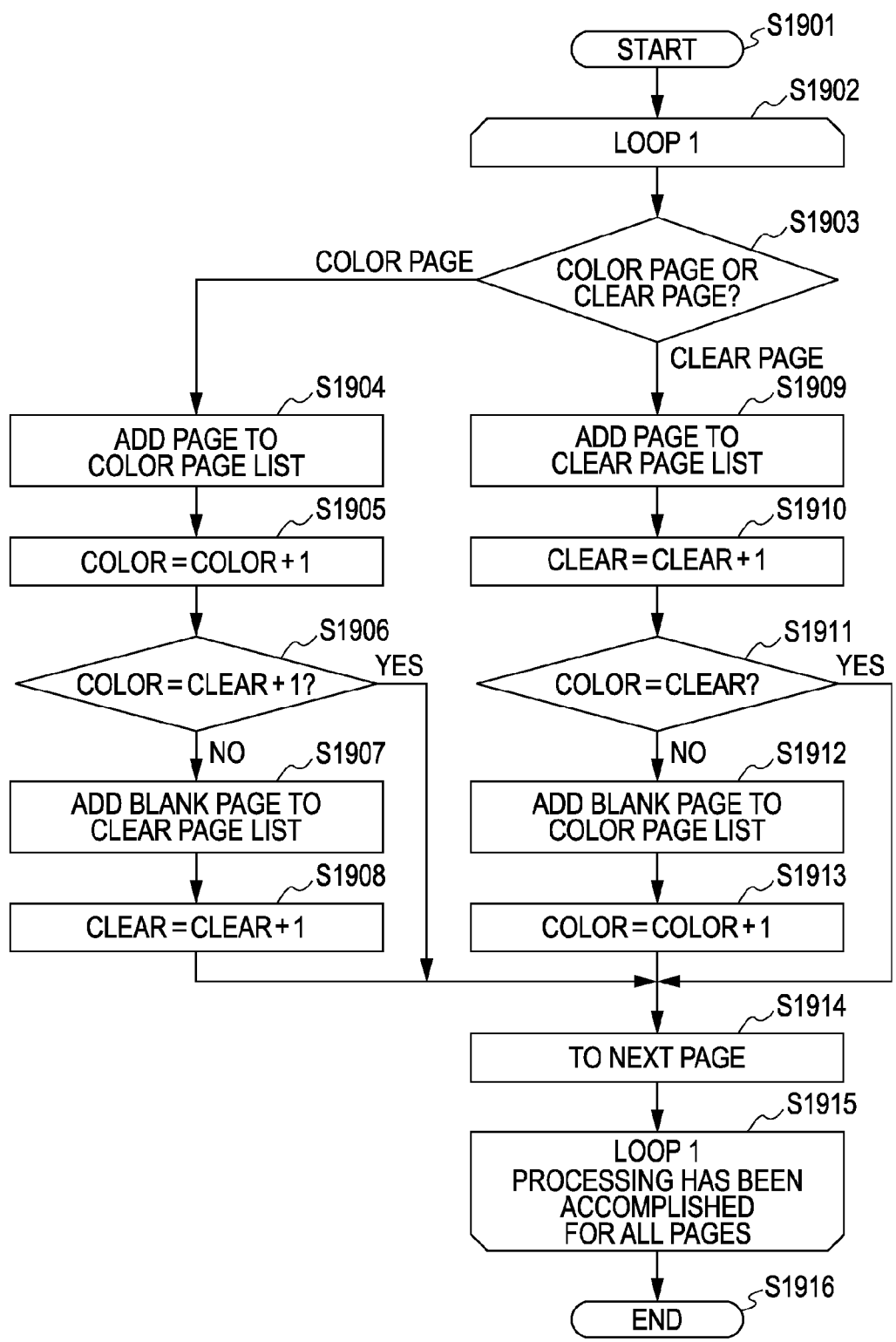
FIG. 21 is a flowchart describing details of operations to assign all of the pages of the job shown in step S1804 in FIG. 20 to a color page list and clear page list.

FIGS. 20 and 21 are flowcharts describing how the printer driver 202 divides and outputs the clear toner page registration job and color toner job according to the second embodiment of the present invention. That is to say, the function shown in the present flowchart is realized by the CPU 101 loading in the RAM 102 and executing the printer driver program recorded in the external memory 111.

With the present embodiment, all of the pages of the job corresponding to the application document 1701 are divided into a clear toner page registration job 1702 and a color toner page job 1703. Thus, the printer driver 202 has to store all of the printing data from the application 200 temporarily in the RAM 102. Note that the processing shown in FIGS. 20 and 21 assumes a state wherein all of the printing data is already stored.

Upon the processing of the flowchart shown in FIG. 20 starting (S1801), the printer driver 202 executed with the CPU 101 (hereafter simply called the printer driver 202) first begins the processing in step S1802.

In step S1802, the CPU 101 creates a blank color page list and clear page list within the RAM 102. These are lists for the purpose of sequentially connecting the page data output with each of the color toner page job 1703 and clear toner page registration job 1702.

Next in step S1803, the printer driver 202 sets the variable "COLOR" and variable "CLEAR" to 0 as initial values. The variables herein are provided within the RAM 102, and are used to store the page numbers for each of the color toner page job 1703 and clear toner page registration job 1702.

In step S1804, the printer driver 202 performs operations to assign all of the pages of the job to the color page list and the clear page list. Note that the details of the procedures in step S1804 are described later with reference to FIG. 21.

Next, in step S1805 the printer driver 202 uses the clear page list to output the clear toner page registration job 1702. The printer driver 202 optionally determines a saving file name to specify as to the printer 150 within the clear toner page registration job 1702. In order to prevent duplication with other jobs, it is desirable to use a general-use unique identifier as a portion of the file name. Upon receiving the clear toner page registration job, the printer 150 stores the job in the external memory 160 with the specified saving file name, and printing is not performed. Note that the total number of clear toner pages is the number of pages stored in the variable CLEAR.

Continuing, the printer driver 202 uses the color page list and outputs the color toner page job 1703 in step S1806. At this time, the file name registered with the printer 150 in step S1805 is specified to the printer 150 so as to specify as a using file name, and to perform partial clear printing. Upon receiving instructions for the partial clear printing, the printer 150 first confirms whether or not the clear toner page registration job of the specified using file name is stored in the external memory 160. In the case of being stored, the first page of the color toner page is layered on the same sheet as the first page of the clear toner page registration job after printing with the color toner, and printed with the clear toner.

Next in step S1807, the printer driver 202 performs deleting instructions of the registration data registered first in step S1805, and ends the processing (S1808). The printer 150 receiving the deleting instructions confirms whether or not the clear toner page registration job is registered in the external memory 160, and if so, the information thereof is deleted.

FIG. 21 is a flowchart showing details of the operations shown in step S1804 in FIG. 20 to assign all pages of the job to a color page list and clear page list.

Upon starting the processing in the flowchart (S1901), the printer driver 202 performs controls so as to repeat steps S1903 through S1914 for all of the pages (LOOP 1: S1902, S1915).

First in step S1903, the printer driver 202 determines whether the page to be processed is a color toner page or a clear toner page. The method of determining is to determine based on the specified page in the "page to print with clear toner" region 611 of the "partial clear details" dialog box 601 in FIG. 6.

In the case of determining in step S1903 that the page to be processed is s color page, the printer driver 202 adds the page to be processed to the color page list in step S1904.

Next, in step S1905, the printer driver 202 increments the variable COLOR.

Next, in step S1906 the printer driver 202 confirms whether COLOR=CLEAR+1 holds. In the case determination is made that COLOR=CLEAR+1 holds in step S1906, the printer driver 202 ends one page worth of processing, and advances the processing to step S1914.

On the other hand, in the case determination is made in step S1906 that COLOR=CLEAR+1 does not hold, this is a time that two color pages are continuous, so the printer driver 202 advances the processing to step S1907. In step S1907 the printer driver 202 adds a blank page to the clear page list, in step S1908 increments the variable CLEAR by 1, ends one page worth of processing, and advances the processing to step S1914.

On the other hand, in the case determination is made in step S1903 that the page to be processed is a clear page, the printer driver 202 adds the page thereof to the clear page list in step S1909.

Next, in step S1910, the printer driver 202 increments the variable CLEAR.

Next, in step S1911 the printer drive 202 confirms whether COLOR=CLEAR holds. In the case determination is made in step S1911 that COLOR=CLEAR holds, the printer driver 202 ends one page worth of processing and advances the processing to step S1914.

On the other hand, in step S1911, in the case determination is made that COLOR=CLEAR does not hold, two continuous pages are clear pages, whereby the printer driver 202 advances the processing to step S1912. In step S1912, the printer driver 202 adds a blank sheet to the color page list, in step S1913 increments the variable COLOR, ends one page worth of processing and advances the processing to step S1914.

In step S1914, the printer driver 202 shifts the page to be processed to the next page, repeats the processing in steps S1903 through S1914 until processing for all pages is finished, and upon processing ending for all of the pages, the processing of the flowchart is ended (S1916). By repeating the above processing, all of the pages will be connected to the color page list or clear page list.

The first and second embodiments of the present invention have been described above. With the first and second embodiments, a clear toner (transparent toner) is taken as an example of a special color toner, but similar embodiments may be used relating to special color wherein the color specification is thought to be difficult with a normal graphics engine, such as white toner or fluorescent toner.

A third embodiment of the present invention will be described with reference to FIGS. 22, 23, and 24. The above-described first and second embodiments are configured to print a portion of the application document created beforehand with an application as a clear toner page. The third embodiment, on the other hand, differs in processing method in that the printer driver 202 automatically generates and prints a clear toner page from a color toner page.

FIG. 22 is a diagram schematically illustrating the application document, a color toner page job which the printer driver 202 issues to the printer 150, a clear toner page registration job which the printer driver 202 generates, and the page output of the printing results. In FIG. 22, 2101 is an application document, 2102 is a color toner page job, 2103 is a clear toner page registration job, and 2104 is a page output of the printing results.

With the present embodiment, the printer driver 202 automatically generates a clear toner page to perform partial coating processing of clear toner to the image portion (image object) of the application document. For example a user interface enabling specifying such as "clear toner printing as to the image portion" may be provided with the printer driver by the user, whereby instructions for automatic generation can be realized. In this case, the user does not have to manually specify the printing region for the clear toner.

Figure 23:
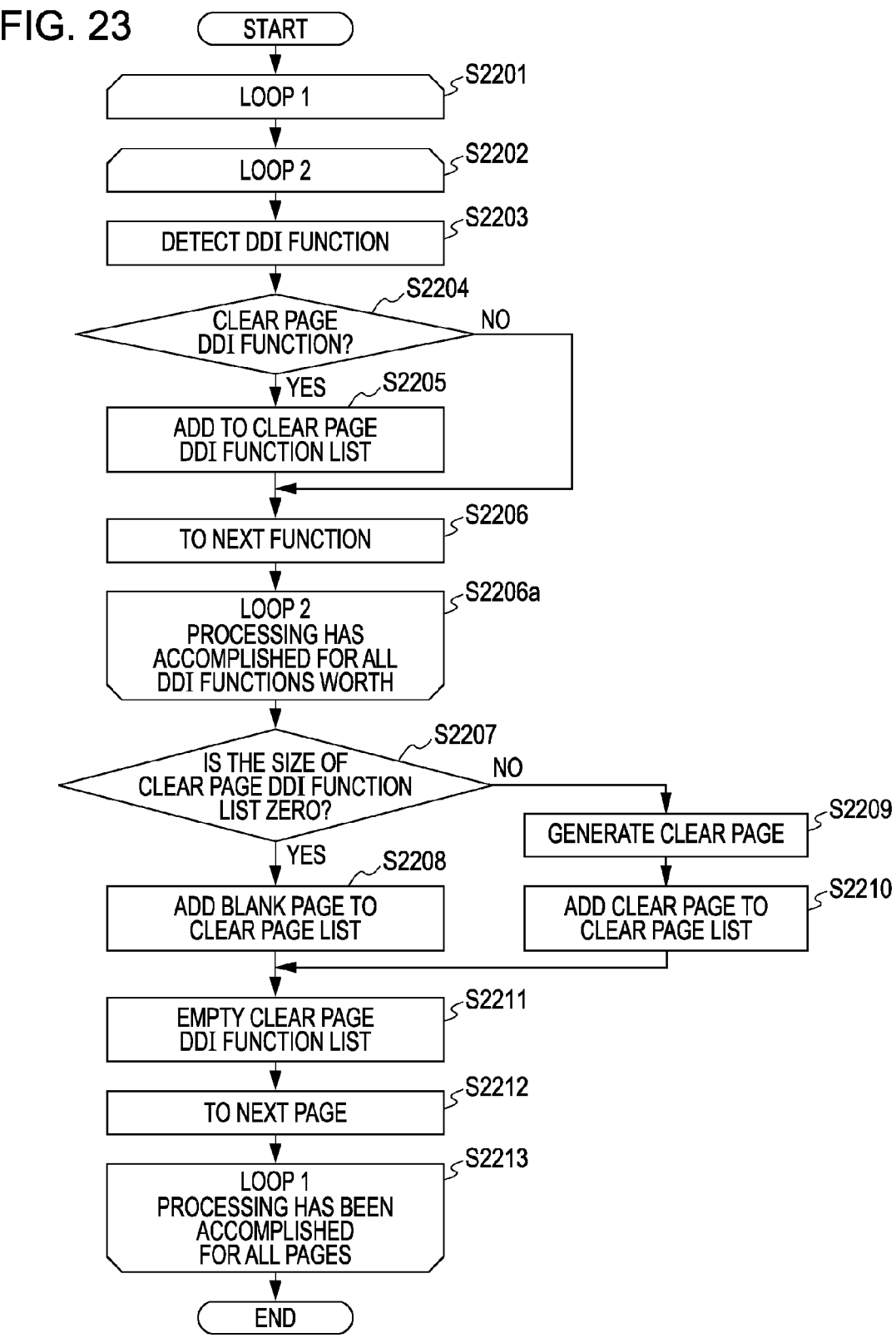
FIG. 23 is a flowchart describing processing for the printer driver to automatically generate a clear toner page from a color toner page according to a third embodiment of the present invention.

FIG. 23 is a flowchart describing processing for the printer driver 202 to automatically generate a clear toner page from a color toner page according to the third embodiment of the present invention. For example, an embodiment is described wherein the color toner page and clear toner page are individually transmitted as two jobs. That is to say, the function shown in the flowchart is realized by the CPU 101 loading the printer drive program recorded in the external memory 111 to the RAM 102 and executing it.

Upon starting processing of the flowchart shown in FIG. 23, the printer driver 202 executed with the CPU 101 (hereafter simply called the printer driver 202) executes step S2201.

In step S2201 the printer driver 202 performs control so as to repeat steps S2202 through S2212 for all of the pages drawn from the application 200 (LOOP 1: S2201, S2213).

The printer driver 202 performs control so as to repeat steps S2203 through S2206 for all of the DDI functions detected within the page to be processed (LOOP 2: S2202, S2206a).

First in step S2203, the printer driver 202 performs detection of a DDI function. A DDI function is a function wherein a GDI function issued by the application 200 is converted with the graphics engine 201. For example, this may be a DrvBitBlt (bit map drawing) or DrvFillPath (color in a path) function.

Next, in step S2204 the printer driver 202 determines whether or not the DDI function detected in step S2203 is a clear page DDI function. The determining herein is performed based on the clear page DDI function definition list shown in FIG. 24. The clear page DDI function definition list will be described now with reference to FIG. 24.

FIG. 24 is a diagram illustrating an example of a DDI function definition list for a clear page which is held by the printer driver 202 and used for determination of step S2204 in FIG. 23. As shown in FIG. 24, with the clear page DDI function definition list, which DDI function is used as the clear page DDI function is defined beforehand, and the printer driver 202 makes the determination based on this.

In the example shown in FIG. 24, the DrvBitblt function for drawing an image (image object) is defined as the clear page DDI function. Note that even if the clear page DDI function definition list is fixedly defined, the user can manually make modifications with the user interface or the like of the printer driver 202. The printer driver 202 generates a clear toner page manually with a following process (S2209) according to the drawing commands shown with the clear page DDI function.

We now return to the description of the flowchart in FIG. 23. In the case determination is made in step S2204 that the DDI function detected in step S2203 is not a clear page DDI function, the printer driver 202 advances the processing to step S2206.

On the other hand, in the case determination is made in step S2204 that the DDI function detected in step S2203 is a clear page DDI function, the printer driver 202 advances the processing to step S2205.

In step S2205, the printer driver 202 adds the DDI function determined in step S2204 as a clear page DDI function to the clear page DDI function within the RAM 102.

Next in step S2206, the printer driver 202 shifts the processing to step S2202 so as to search for the next function.

Upon completing the processing in steps S2203 through S2206 as to all of the DDI functions within one page, the printer driver 202 advances processing to step S2207.

In step S2207, the printer driver 202 determines whether or not the size of the clear page DDI function list is 0.

In the case determination is made in step S2207 that the size of the clear page DDI function list is 0, the printer driver 202 adds a blank page to the clear page list in step S2208, and advances the processing to step S2211.

On the other hand, in the case determination is made in step S2207 that the size of the clear page DDI function list is not 0, the printer driver 202 performs automatic generation of a clear page in step S2009. The printer driver 202 automatically generates a clear page according to the drawing command of the DDI function included in the clear page DDI function list.

Next, in step S2210 the printer driver 202 adds the clear page automatically generated in step S2209 to the clear page list in the RAM 102, and advances the processing to step S2211.

Next, in step S2211 the printer driver 202 empties the content of the clear page DDI function list.

Next, in step S2212 the printer driver 202 shifts the page to be processed to the next page, and shifts the processing to step S2201.

Upon steps S2202 through S2212 being completed for all of the pages, the printer driver 202 ends the processing in the flowchart.

The printer driver 202 thus adds a clear page or blank page to the clear page list as to all of the pages drawn from the application 200. Consequently, the clear toner page registration job 2104 in FIG. 22 is automatically generated by the printer driver 202. Subsequently, similar to the above-described second embodiment, printing instructions are performed as to the printer 150 with two jobs (color toner page job 2102, clear toner page registration job 2103).

A fourth embodiment of the present invention will be described with reference to FIGS. 25 through 28. In the third embodiment, the clear toner page is always automatically generated with the printer driver 202. However, in the fourth embodiment, a processing method differs in that a clear toner page is not generated as a duplicate as to the page having the same printed image. FIG. 25 is a schematic diagram illustrating the difference in clear toner page registration jobs generated with the third embodiment and the fourth embodiment of the present invention.

As shown in 2401 in FIG. 25, with the third embodiment, a clear page of the same printed image is generated on the second page and the fifth page, whereby unnecessary communication is generated at the time of printing. With the fourth embodiment, as shown in 2402 in FIG. 25, a clear page having the same printed image is not generated, thereby omitting unnecessary communication. This is also effective in a case wherein multiple copies are specified with the printer driver 202.

Figure 26:
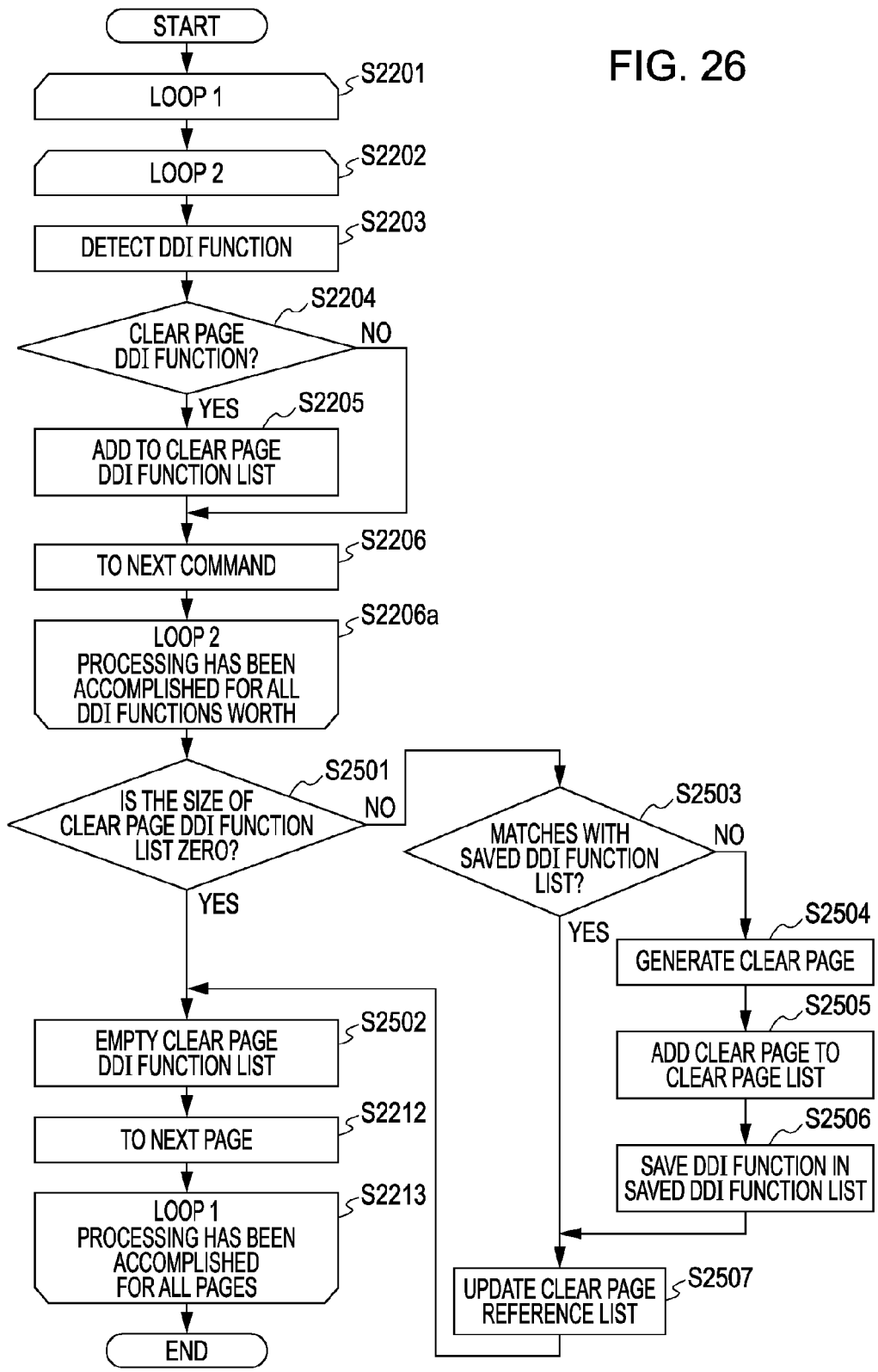
FIG. 26 is a flowchart describing processing for the printer driver to automatically generate a clear toner page from a color toner page according to a fourth embodiment of the present invention.

FIG. 26 is a flowchart describing processing for the printer driver 202 to automatically generate a clear toner page from a color toner page according to the fourth embodiment of the present invention. That is to say, the function shown on the flowchart is realized by the CPU 101 loading on the RAM 102 and executing the printer driver program recorded in the external memory 111. Note that in FIG. 26 the same steps as those in FIG. 23 are referenced with the same step numbers. Hereafter, only the differences with FIG. 23 will be described.

Upon completing the processing in steps S2203 through S2206 as to all of the DDI functions within one page, the printer driver 202 executed with the CPU 101 (hereafter simply called the printer driver 202) advances the processing to step S2501.

In step S2501 the printer driver 202 determines whether or not the size of the clear page DDI function list is 0.

In the case determination is made in step S2501 that the size of the clear page DDI function list is 0, the printer driver 202 advances the processing without change to step S2502.

On the other hand, in the case determination is made in step S2501 that the size of the clear page DDI function list is not 0, the printer driver 202 advances the processing without change to step S2503.

In step S2503, the printer driver 202 determines whether or not that which is similar to the clear page DDI function list of the page currently being analyzed is included in the DDI function list saved in the RAM 102. The saved DDI function list will now be described with reference to FIG. 27.

FIG. 27 is a diagram schematically illustrating a DDI function list saved within the RAM 102. As shown in FIG. 27, the name of the clear page DDI function detected for each page, the parameters, and detected page numbers, are stored in the saved DDI function list (stored in the later-described step S2506). The printer driver 202 performs the determination in step S2503 in FIG. 26 described above, based on the information herein. For example, FIG. 27 shows a state of the saved DDI function list at the point-in-time that the analysis has ended for up to the fourth page of the application document 2101 shown in FIG. 22.

The list already has DDI function (DrvBitBlt) information in the second and third pages stored therein. In the event of analyzing the fifth page, the DDI function "DrvBitBlt (10, 100, 200, 70)" is stored in the clear page DDI function list. This matches the content of the first row of the saved DDI function list, whereby in step S2503 in FIG. 26 is determined as "match with saved DDI function list".

We now return to the description of the flowchart in FIG. 26. In the case determination is made in step S2503 that that which is similar as the clear page DDI function list in the page currently being analyzed is included in the saved DDI function list, the printer driver 202 advances the processing without change to step S2507.

On the other hand, in the case determination is made in step S2503 that that which is similar as the clear page DDI function list in the page currently being analyzed (the page to be processed) is not included in the saved DDI function list, the printer driver 202 advances the processing to step S2504.

In step S2504 the printer driver 202 automatically generates a clear page based on the drawing command shown by the DDI function stored in the clear page DDI function list.

Next, in step S2505 the printer driver 202 adds the clear page generated in step S2504 to the clear page list.

Next in step S2506 the printer driver 202 adds the content of the clear page DDI function list of the page being analyzed to the saved DDI function list, and advances the processing to step S2507.

In step S2507, the printer driver 202 performs updates to a clear page reference list in the RAM 102. The clear page reference list will be now described with reference to FIG. 28.

FIG. 28 is a diagram schematically illustrating a clear page reference list.

With the present embodiment, clear page generating for similar printing images is omitted, whereby there may be cases that the number of pages for color toner pages and clear toner pages do not match. Therefore, as shown in FIG. 28, the correlation between the color toner pages and the clear toner pages to be applicable thereto is held with the clear page reference list.

We now return to the description of the flowchart in FIG. 26. In step S2507, the information of the clear page reference list shown in FIG. 28 is updated. For example, upon the analysis of the fifth page ending, the information "color toner page number 5" and "clear toner page number 1" is rewritten, as can be seen in line 3 of the list in FIG. 28. The processing then advances to step S2502.

Next, in step S2502 the printer driver 202 empties the content of the clear page DDI function list, in step S2212 shift the page to be processed to the next page, and shifts the processing to step S2201.

Thus, by repeating the processing of steps S2201 through S2206, S2501 through S2507, and S2212, two pages worth of a clear toner page registration job shown in 2402 in FIG. 25 is automatically generated with the printer driver 202.

The generated job is transmitted from the printer driver 202 to the printer 150, similar to the above-described second embodiment. At this time, the printer driver 202 transmits clear page reference list information to the printer 150 which indicates which clear toner page to layer and print over which color toner page. The printer 150 performs processing according to the information of the clear page reference list.

A fifth embodiment of the present invention will be described with reference to FIGS. 29 through 31. With the above-described fourth embodiment, determination is made simply as to whether or not the printed images are the same, thereby preventing duplication of generating clear toner pages. However, with the fifth embodiment, a processing method differs in that determination is made only as to whether or not the object shape and size of the object drawn with the DDI function are the same.

Figure 29:
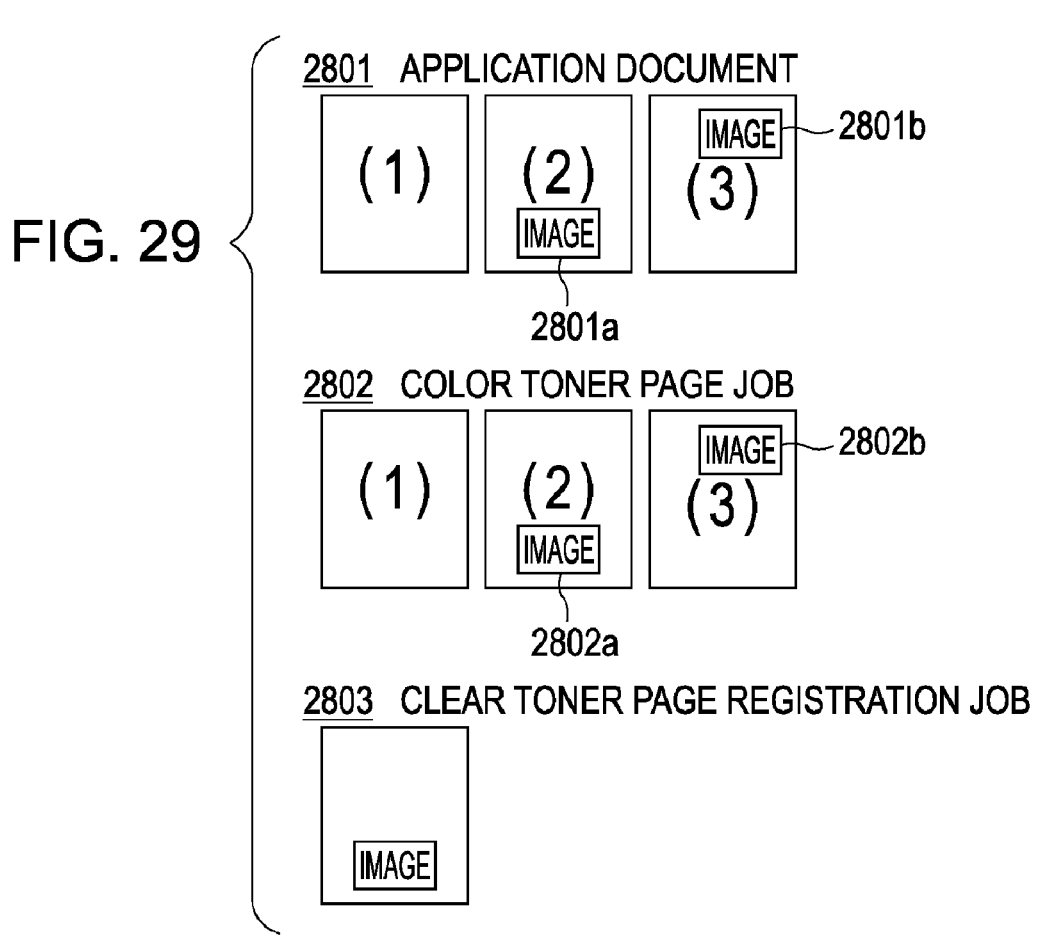
FIG. 29 is a diagram schematically illustrating the application document, and page output of a color toner page job which the printer driver issues as to the printer, and a clear toner page registration job which the printer driver generates.

FIG. 29 is a diagram schematically illustrating the application document, and page output of a color toner page job which the printer driver 202 issues as to the printer 150, and a clear toner page registration job which the printer driver 202 generates. As shown in FIG. 29, the image 2801a included in the second page of the application document 2801 and the vertical/horizontal sizes of the image 2801b included in the third page are the same.

In such a case, the printer driver 202 of the present embodiment generates only one page of the clear toner page, as shown in 2803, shifts the offset at time of printing, overlays 2802a and 2802b, thereby omitting the clear toner processing and conserving the amount of communication and so forth.

With the operations of the printer driver 202 in the fifth embodiment, the portions differing from the above-described fourth embodiment are only steps S2503 and S2507 in FIG. 26. Only the portions differing from the fourth embodiment will be described below with reference to FIGS. 26 and 30.

FIG. 30 is a diagram schematically illustrating the saved DDI function list according to the fifth embodiment of the present embodiment. With the fifth embodiment, in step S2503 in FIG. 26 the printer driver 202 performs the determining processing as to whether or not to include in the saved DDI function list, as described below. In the case that the saved DDI function list is in a state as shown in FIG. 30, the content of the clear page DDI function becomes "DrvBitBlt (15, 10, 200, 70)".

At this time, the printer driver 202 performs comparison with focus only on the portion related to the size of the DrvBitBlt command. That is to say, the clear page DDI function list is width: 200 and height: 70, and the page 2 of the saved DDI function list in FIG. 30 is also width: 200 and height: 70, so are determined to be the same (match). That is to say, processing is advanced to step S2507. Note that the brackets ([ ]) in the function named in FIG. 30 indicate that comparison of such portion is to be omitted.

Next, in step S2507 the printer driver 202 updates the clear page reference list based on the determination results with step S2503.

FIG. 31 is a diagram illustrating content of an updated clear page reference list. In FIG. 31, X coordinate difference and Y coordinate difference of the DrvBitBlt function, which are found in the event of comparing the saved DDI function list and clear page DDI function list in step S2503 in FIG. 26, are stored in the offset X and offset Y.

The printer driver 202 transmits the clear page reference list updated in step S2507 in FIG. 26 to the printer 150. The printer 150 shifts the page of the instructed clear toner page number the amount of the instructed offset to overlay on the color page and prints, based on the clear page reference list information transmitted from the printer driver 202.

With the sixth embodiment, in the case that even-numbered pages or odd-numbered pages are specified as the pages to print with clear toner, arbitrary/optional pages that are not subject to clear toner printing out of the even-numbered pages or odd-numbered pages can be specified as non-clear toner printing specified pages (non-special color toner printing specified pages).

With the sixth embodiment of the present invention, the clear toner page specifying processing and print job generating processing differ from the above-described first and second embodiment. Accordingly, the differing processing will be described in detail.

By applying the present embodiment, in the case that drawing data for the color toner and drawing data for the clear toner are prepared, a job specifying that clear toner printing is not performed for optional pages can be generated. Also, by controlling the drawing data for the clear toner equating to the non-clear toner printing specifying pages so as to not be sent to the printer 150, the data amount of the job to be printed can be reduced. Further, by adding a blank sheet non-charge setting to the non-clear toner printing specified page, an advantage can be obtained to enable control so as to not charge for clear toner at the time of printing this page.

Figure 32:
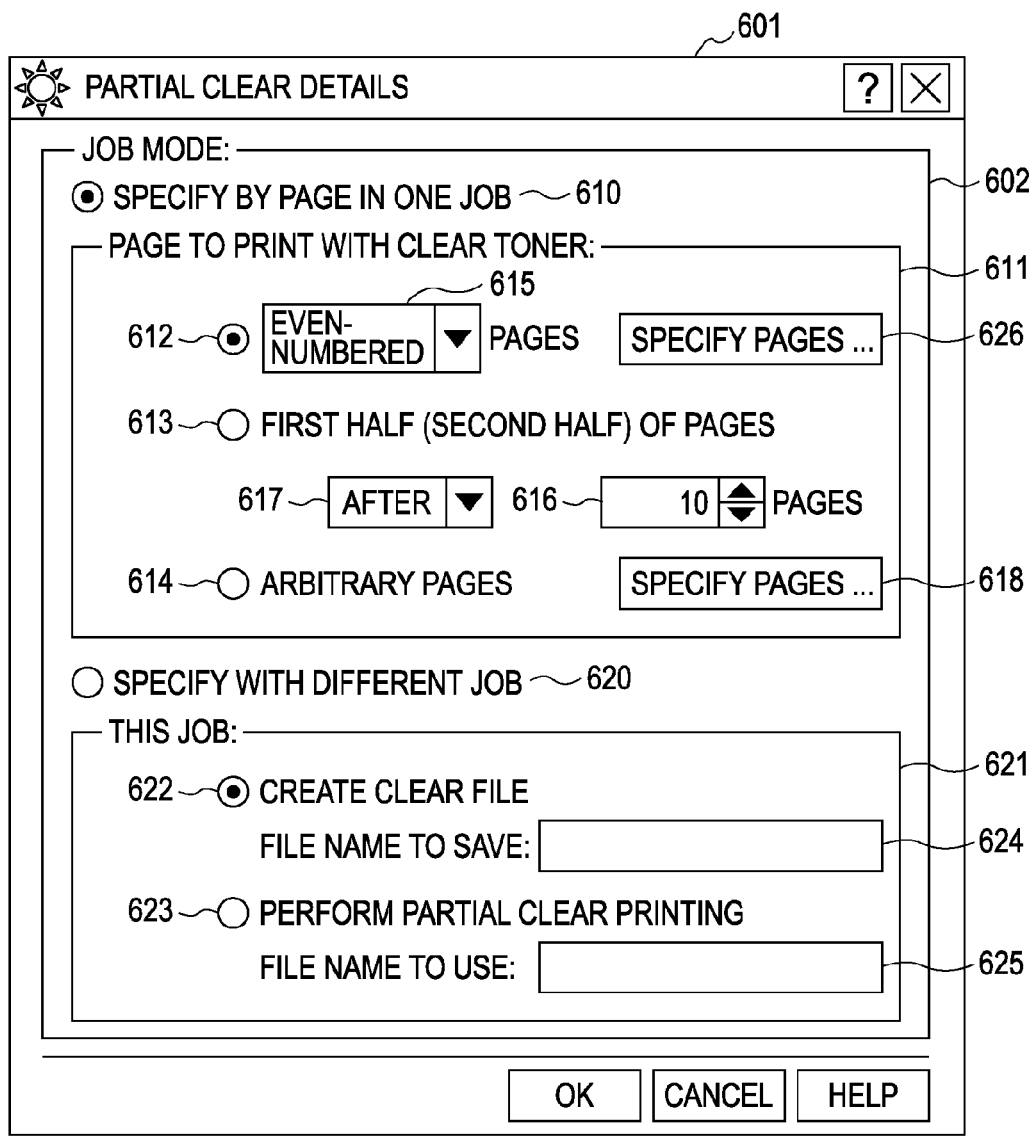
FIG. 32 is a diagram illustrating another example of the user interface of the "partial clear details dialog box which the printer driver opens in the event that the "partial clear details" button shown in FIG. 5 is pressed by the user.

A user interface example of the "partial clear details" dialog box 601 according to the sixth embodiment of the present invention will be described with reference to FIG. 32. FIG. 32 is a diagram illustrating another example of the user interface of the "partial clear details dialog box 601 which the printer driver 202 opens in the event that the "partial clear details" button 507 shown in FIG. 5 is pressed by the user. Note that that which is the same as FIG. 6 is referenced with the same reference numeral.

In the user interface example shown in FIG. 32, the region 611 of the page to be printed with clear toner has a "specify page" button 626. Upon the "specify page" button 626 being pressed while the radio button 612 is in a selected state, the printer driver 202 displays the dialog box 3101 shown in the later-described FIG. 33 on the CRT 110. With the dialog box 3101, arbitrary/optional pages which are not to be subject to clear toner printing out of the even-numbered pages or odd-numbered pages can be specified as non-clear toner pages.

Figure 33:
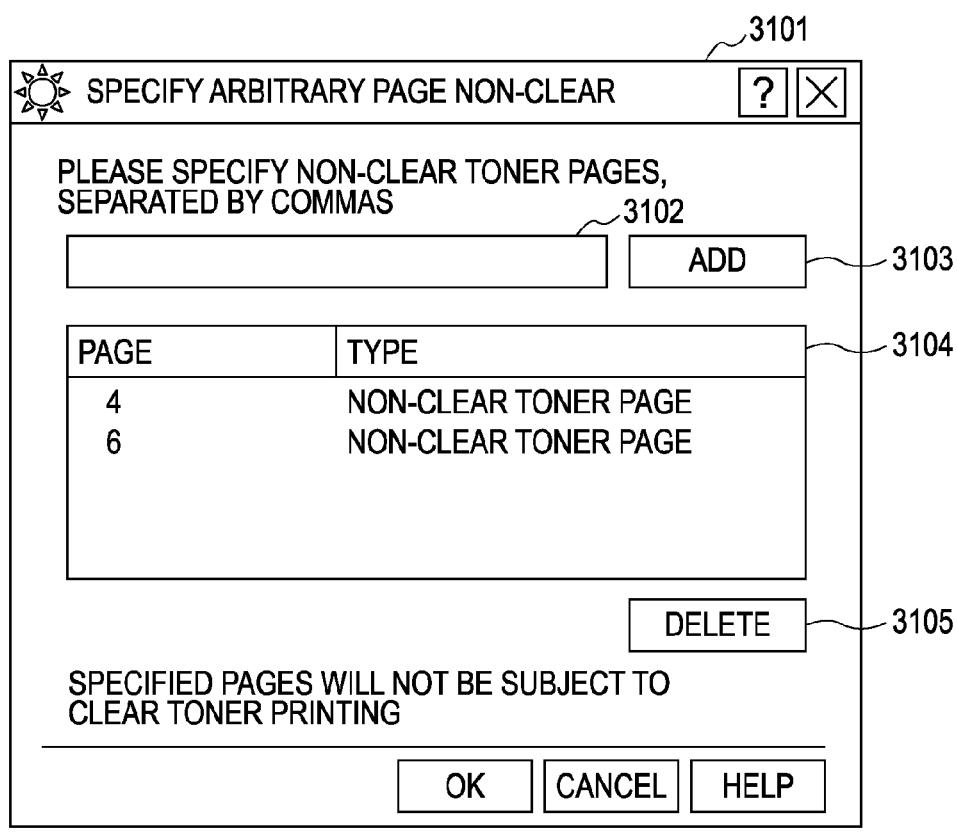
FIG. 33 is a diagram illustrating a user interface of an optional page non-clear specifying dialog box (displayed on the CRT) which the printer driver opens in the event that the "specify pages" button is pressed in the state that the radio button is selected.

FIG. 33 is a diagram illustrating a user interface of an optional page non-clear specifying dialog box (non-special color toner printing specified page instructing screen) which the printer driver 202 opens (displayed on the CRT 110) in the event that the "specify pages" button 626 is pressed in the state wherein the radio button 612 is selected. As shown in FIG. 33, the user inputs page numbers not to be printed with clear toner in the edit box region 3102, separated by commas. Upon the "add" button 3103 being pressed, the printer driver 202 displays the page numbers, which are input in the edit box region 3102, in the list box 3104, one row at a time.

Upon the "delete" button 3105 being pressed while in the state that the row displaying the page number of the list box 3104 is selected, the printer driver 202 deletes the row selected within the list box 3104.

Note that in this example, the pages input on the user interface are specified as non-clear toner pages (pages to not print with clear toner) out of the even-numbered pages or odd-numbered pages selected in the combo box 615 as pages to print with the clear toner. Therefore, in the case that even-numbered pages are selected in the combo box 615, it is desirable for the printer driver 202 to perform control with the user interface so that odd-numbered pages cannot be input. Also, conversely, in the case that odd-numbered pages are selected, it is desirable for the printer driver 202 to perform control with the user interface so that even-numbered pages cannot be input.

Note that in the event that the "specify pages" button 626 is pressed in the state that "first (second) half of pages" is selected with the radio button 613, the printer driver 202 may be arranged to open (display on the CRT 110) the optional page non-clear specifying dialog box in FIG. 33. In this case, the pages input on the user interface are specified as non-clear toner pages (pages to not print with clear toner) out of the first half of pages or second half of pages selected in the combo boxes 616 and 617 as pages to print with the clear toner. Therefore, in the case that the first half of pages are selected in the combo boxes 616 and 617, it is desirable for the printer driver 202 to perform control with the user interface so that the second half of pages cannot be input. Also, conversely, in the case that second half of pages are selected, it is desirable for the printer driver 202 to perform control with the user interface so that the first half of pages cannot be input.

An input/output example to the printer driver 202 in the event of non-clear toner pages being specified in FIGS. 32 and 33 will be described with reference to FIG. 34.

Figure 34:
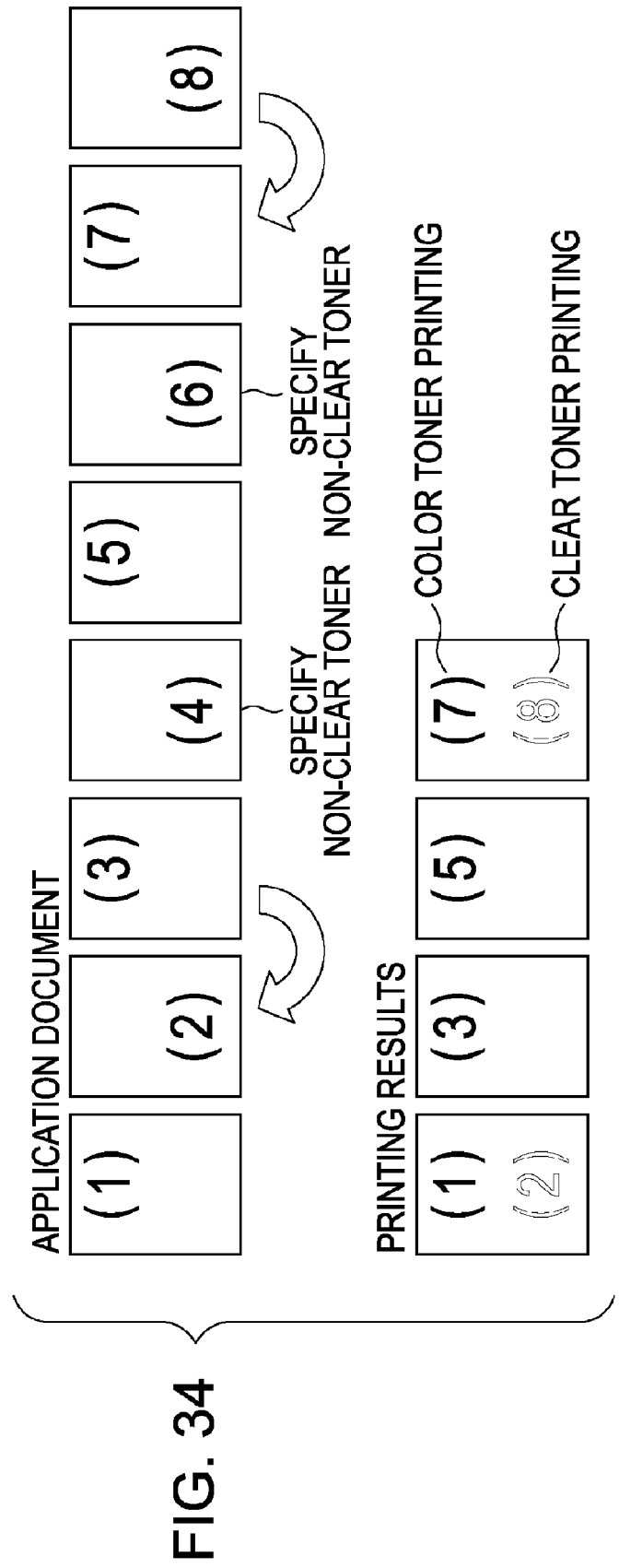
FIG. 34 is a diagram illustrating input to the printer driver and output from the printer at the time that the "specify page" button in FIG. 32 is instructed and non-clear toner page is specified with the optional page non-clear specifying dialog box in FIG. 33.

FIG. 34 is a diagram illustrating input to the printer driver 202 and output from the printer 150 at the time that the "specify page" button 626a in FIG. 32 is instructed and non-clear toner page is specified with the optional page non-clear specifying dialog box in FIG. 33. In FIG. 34 also, similar to FIG. 9 as shown in the first embodiment, input to the printer deriver 202 is indicated in the form of an application document, and output from the printer 150 is indicated in the form of printing results.

In FIG. 34, of the multiple pages of the application document, even-numbered pages are specified to be printed with the clear toner, and further, as shown in FIG. 33, an example in the event of the user specifying pages 4 and 6 as non-clear toner pages are shown.

As shown in FIG. 34, the printer driver 202 instructs the printer 150 to lay the even-numbered pages other than pages 4 and 6 over the odd-numbered pages of the previous page, and print. That is to say, the printer driver 202 performs instructions as to the printer 150 so as to print the data of the second page with clear toner on top of the color (CMYK) toner of the first page. Also, the printer driver 202 performs instructions as to the printer 150 so as to not print with clear toner on top of the color (CMYK) toner of the third and fifth pages. Further, the printer driver 202 performs instructions as to the printer 150 so as to print the data of the eighth page with clear toner on top of the color (CMYK) toner of the seventh page. Consequently, as shown in FIG. 34, the full 8-page application document becomes a full 4-page printed result.

Note that as long as the printing results as to the application document are as shown in FIG. 34, the method of realizing the result may be any method. This is the same as with the example shown in FIG. 9 with the first embodiment.

A method of instructing from the printer driver 202 to the printer 150 will be described in detail with reference to FIGS. 35 through 37. FIGS. 35A and 35B are diagrams illustrating a method to embed clear toner drawing information in PDL data according to a sixth embodiment of the present invention, and correspond to a case wherein all of the drawing data of the clear toner printing specified pages are the same. Note that settings wherein the drawing data of the clear toner printing specified pages are all the same may be provided to the printer driver.

FIG. 35A shows an example of the application document and printing results with the third embodiment. Also, FIG. 35B shows an overview of the PDL data within the spool file that the printer driver 202 outputs to the printer 150.

As shown in FIG. 35A, the same drawing data is included in the even-numbered pages 3309 and 3310 of the application document. Note that page 4 (3310) in FIG. 35A is specified as a non-clear toner page.

Reference numeral 3301 in FIG. 35B denotes an example of a spool file at the time that the application document in FIG. 35A is issues as a normal job without applying the present embodiment. In 3301 of FIG. 35B, the job is surrounded by two commands of 33011 and 33024. Further, 33012 and 33014 indicate the start and end of the first page, and a drawing command 33013 for the first page is stored therebetween.

Thereafter, similarly, 33015 and 33017 indicate the start and end of the second page, and a drawing command 33016 for the second page is stored therebetween. Reference numerals 33018 and 33020 indicate the start and end of the third page, and the drawing command 33019 for the third page is stored therebetween. Reference numerals 33021 and 33023 indicate the start and end of the fourth page, and the drawing command 33022 for the fourth page is stored therebetween.

The drawing data (1) 33013 and drawing data (2) 33016 and drawing data (3) 33019 and drawing data (4) 33022 are surrounded by commands for each page, and are output as drawing data for each page.

On the other hand, 3302 in FIG. 35B shows a first example of the spool file of a job issued using the present embodiment. Note that page 4 (3310) in FIG. 35A is specified as a non-clear toner page. In 3302 in FIG. 35B, the job is surrounded by two commands of 33031 and 33042.

Directly therebelow, the drawing data (2) 33033 is surrounded by 33032 and 33034. This indicates that the image data (2) 33033 is printed using clear toner for all of the pages.

Next, the drawing data (1) 33036 is surrounded by 33035 and 33037 of the first page. This indicates that the drawing data (1) is printed using color toner with the data for color toner of the first page.

Next, the drawing data (3) 33039 and blank page non-charge setting (3) 33040 is surrounded by 33038 and 33041 of the second page. Note that the blank page non-charge setting is a command to instruct the printer 150 so that the clear toner charge counter does not count up this page (so that clear toner charge is not performed as to this page).

This indicates that the drawing data (3) 33039 prints using color toner with the data for color toner of the second page, but that clear toner printing is not performed on the same page. This is because page 4 (3310 in FIG. 35B is specified as a non-clear toner page.

Upon receiving the job 3302, the printer 150 prints the drawing data (2) 33033 with clear toner on the first page, after printing the drawing data (1) 33036 with color toner on the first page.

Further, the printer 150 prints the drawing data (3) 33039 with color toner on the second page. However, since the blank page non-charge setting (3) 33040 is included in 33038 and 33041 of the second page, the printer 150 does not print the drawing data (3) 33033 with clear toner on the second page.

Also, the printer 150 counts up the color printing charge counter in the case of printing with color toner, and counts up the clear toner printing charge counter in the case of printing with clear toner. In the case of the present embodiment, the color charge counter counts two, and the clear toner charge counter counts one.

FIGS. 36A and 36B are diagrams illustrating a method to embed clear toner drawing information in PDL data according to a sixth embodiment of the present invention, and correspond to a case wherein the drawing data of the clear toner printing specified pages is not all the same.

FIG. 36A shows an example of the application document and printing results with the sixth embodiment. Also, FIG. 36B shows an overview of the PDL data within the spool file that the printer driver 202 outputs as to the printer 150. As shown in FIG. 36A, the even-numbered pages 3409 and 3410 of the application document are not the same drawing data. Note that page 4 (3410) in FIG. 36A is specified as a non-clear toner page.

Reference numeral 3401 in FIG. 36B shows an example of the spool file at the time the application document in FIG. 36A is issued as a normal job instead of applying the present embodiment. In 3401 of FIG. 36B, the job is surrounded by two commands of 34011 and 34024. Further, 34012 and 34014 indicate the start and end of the first page, and a drawing command 34013 for the first page is stored therebetween.

Thereafter, similarly, 34015 and 34017 indicate the start and end of the second page, and a drawing command 34016 for the second page is stored therebetween. Reference numerals 34018 and 34020 indicate the start and end of the third page, and the drawing command 34019 for the third page is stored therebetween. Reference numerals 34021 and 34023 indicate the start and end of the fourth page, and the drawing command 34022 for the fourth page is stored therebetween.

The drawing data (1) 34013 and drawing data (2) 34016 and drawing data (3) 34019 and drawing data (4) 34022 are surrounded by commands for each page, and are output as drawing data for each page.

On the other hand, 3402 in FIG. 36B shows an example of the spool file of a job issued using the present embodiment. In 3402 in FIG. 36B, the job is surrounded by two commands of 34031 and 34042.

The drawing data (1) 34033 and drawing data (2) 34035 are both surrounded by one 34032 and 34037. This indicates that the type of toner differs but both are to be printed on the same page.

The drawing data (1) 34033 of the first page is the same layout as normal because of the color toner data, but the drawing data (2) 34035 of the second page is laid out between the 34034 and 34036. This indicates that the drawing data (1) 34033 is printed using color toner with the data for color toner of the first page, and the drawing data (2) 34035 is printed using clear toner with the data for clear toner of the first page.

Next, the drawing data (3) 34039 and blank page non-charge setting (3) 34040 are surrounded by 34038 and 34041 of the second page. This indicates that the drawing data (3) 34039 is printed using color toner with the data for color toner of the second page, but clear toner printing is not performed on the same page.

Note that page 4 (3410) in FIG. 36A is specified as a non-clear toner page. Therefore, the data equating to the drawing data (4) 34022 of the spool file 3401 is deleted in the process of creating the print JOB, and does not exist in the spool file 3402.

Upon receiving the job shown with 3402 in FIG. 36B, the drawing data (2) 34035 is printed on the first page with clear toner after the drawing data (1) 34033 is printed on the first page with color toner.

Next, the drawing data (3) 34039 is printed on the second page with color toner, but the blank page non-charge setting (3) 34040 is included in 34038 and 34041 of the second page, whereby the second page is not printed with clear toner.

In the case of color toner printing, the printer 150 counts up the color printing charge counter, and in the case of clear toner printing, the printer 150 counts up the clear printing charge counter. In the case of the present embodiment, the color charge counter counts two, and the clear toner charge counter counts one.

Thus, with the sixth embodiment, the printer driver 202 performs work to convert four pages worth of application document into two pages worth of PDL data. A four page document is given here as a simple example, but even if the number of pages increase, the processing method does not change. Also, as described above, multiple methods are prepared to specify which page combinations to put together of the multiple pages of the application documents.

Next, operations of the printer driver 202 with the sixth embodiment of the present invention will be described with reference to the flowchart in FIG. 37. FIG. 37 is a flowchart describing operations of the printer driver 202 according to the sixth embodiment of the present invention. That is to say, the functions shown in the flowchart are realized by the CPU 101 loading in the RAM 102 and executing the printer driver program recorded in the external memory 111.

Upon the user instructing printing with the application 200, the CPU 101 loads the printer driver 202 stored in the external memory 111 into the RAM 102, executes with the CPU 101, and starts printing processing.

First, the printer driver 202 executed with the CPU 101 (hereafter simply called printer driver 202) issues a job start command in step S3501.

Next in step S3502, the printer driver 202 determines whether or not all of the drawing data of the clear toner printing specified pages is all the same. The determination herein may be determined by comparing the drawing data of the clear toner printing specified pages, or may be determined based on the printer driver settings or the like.

In the case determination is made in step S3502 that all of the drawing data of the clear toner printing specified pages is the same, the printer driver 202 advances the processing to step S3503.

In step S3503, the printer driver 202 issues a clear start command, and declares that the drawing commands from here on out will specify printing with clear toner for all pages.

Next, in step S3504 the printer driver 202 converts all of the objects of the clear toner printing specified pages drawn from the application 200 into PDL, and issues a drawing command.

Upon issuing all of the drawing commands for a page, the printer driver 202 issues a clear end command in step S3505.

Next, the printer driver 202 performs control so as to repeat steps S3507 through S3514 as to all of the pages drawn from the application 200 (S3506, S3514).

First, in step S3507 the printer driver 202 determines whether the page to be processed is a color toner page or a clear toner page. The method of determining is to determine based on the specified page in the "page to print with clear toner" region 611 of the "partial clear details" dialog box 601 in FIG. 32.

In the case of determining in step S3507 that the page to be processed is s color toner page, the printer driver 202 issues a page start command in step S3508.

Next in step S3509, the printer driver 202 converts the objects drawn from the application 200 into PDL and issues a normal drawing command.

Upon issuing of all of the drawing commands within the page ending, the printer driver 202 determines in step S3510 whether or not the clear pages to be overlaid on this page is specified as a "non-clear toner page". The method of determining is to determine based on the specified page in the "list box" 3104 of the "optional page non-clear specifying" dialog box 3101 in FIG. 33. Note that with the example shown in FIG. 35A, the clear page (fourth page) to be layered over the third page of the application document is specified as a "non-clear toner page".

In the case determination is made in step S3510 that the clear page to be layered over the page (the page to be processed) is specified as a "non-clear toner page", the printer driver 202 advances the processing to step S3511.

In step S3511, the printer driver 202 issues a blank page non-charge setting command (blank page non-charge setting instructions), and advances the processing to step S3513.

On the other hand, in the case determination is made in step S3510 that the clear page to be layered over the page (the page to be processed) is not specified as a "non-clear toner page", the printer driver 202 advances the processing without change to step S3513.

On the other hand, in the case determination is made in step S3507 that the page to be processed is a clear page, the printer driver 202 discards the drawing data in step S3512, and advances the processing to step S3513.

In step S3513 the printer driver 202 issues a page end command, and in step S3514 shifts the focus thereof to the next page (page to be processed).

Subsequently, in the case determination is made that the processing of steps S3507 through S3514 has been repeated for all of the pages (LOOP 1: S3506, S3515), the printer driver 202 advances the processing to step S3516, issues a job end command, and ends the job.

On the other hand in step S3502, in the case determination is made that the drawing data of the clear toner printing specified pages is not all the same, the printer driver 202 performs control so that steps S3518 through S3527 are repeated for all of the pages drawn from the application 200 (LOOP 2: S3517, S3528).

First, in step S3518 the printer driver 202 issues a page start command.

Next, in step S3519 the printer driver 202 determines whether or not the page to be processed is a color toner page or clear toner page. The method of determining is to determine based on the specified page in the "page to print with clear toner" region 611a of the "partial clear details" dialog box 601a in FIG. 32.

In the case determination is made in step S3519 that the page to be processed is a color toner page, in step S3520 the printer driver 202 converts the object drawn from the application 200 into PDL, and issues a normal drawing command.

Upon issuing of all of the drawing commands within the page have ended, the printer driver 202 determines in step S3521 whether the clear page to be layered over the page (page to be processed) is specified as a "non-clear toner page". The method of determining is to determine based on the page specified in the "list box" 3104 of the "optional page non-clear specifying" dialog box 3101 in FIG. 33. Note that with the example shown in FIG. 36A, the clear page (page 4) that is to be layered over the page 3 of the application document is specified as a "non-clear toner page".

In the case determination is made in step S3521 that the clear page to be layered on the page (page to be processed) is specified as a "non-clear toner page", the printer driver 202 advances the processing to step S3522.

In step S3522, the printer driver 202 issues a blank page non-charge setting command, and advances the processing to step S3523.

Next, in step S3523 the printer driver 202 determines whether or not the next page after the page to be processed is a color toner page or a clear toner page. The method of determining is to determine based on the specified page in the "page to print with clear toner" region 611 of the "partial clear details" dialog box 601 in FIG. 32.

In the case determination is made in step S3523 that the next page after the page to be processed is a clear toner page, the printer driver 202 shifts focus to the next page (page to be processed) (S3524). In step S3525, the printer driver 202 discards the drawing data, and advances the processing to step S3526.

On the other hand, in the case determination is made in step S3523 that the next page after the page to be processed is a color toner page, the printer driver 202 advances the processing to step S3526 without change.

In step S3526, the printer driver 202 issues a page end command and shifts focus to the next page (page to be processed) (S3527).

On the other hand, in the case determination is made in step S3521 that the clear page to be layered over the page (page to be processed) is not specified as a "non-clear toner page", the printer driver 202 advances the processing to step S3529.

In 3529, the printer driver 202 determines whether the next page after the page to be processed is a color toner page or a clear toner page. The method of determining is to determine based on the specified page in the "page to print with clear toner" region 611 of the "partial clear details" dialog box 601 in FIG. 32.

In the case determination is made in step S3529 that the next page after the page to be processed is a clear toner page, the printer driver 202 shifts focus to the next page (page to be processed) in step S3530.

Next, in step S3531, the printer driver 202 issues a clear start command, and declares that the drawing commands from here on out will instruct printing with clear toner.

Next, in step S3532, the printer driver 202 converts all of the objects drawn from the application as to the page to be processing into PDL, and issues a drawing command.

Upon all of the drawing commands of such page being issued, the printer driver 202 issues a clear end command in step S3533, and advances processing to step S3526.

On the other hand, in the event determination is made in step S3529 that the next page is a color toner page, the printer driver 202 advances the processing to step S3526 without change.

In step S3526, the printer driver 202 issues a page end command and shifts focus to the next page (page to be processed) (S3527).

On the other hand, in the case determination is made in step S3519 that the next page is a clear toner page, the printer driver 202 advances the processing to step S3537.

In step S3537, the printer driver 202 determines whether or not the page (page to be processed) is specified as a non-clear toner page.

In the case determination is made in step S3537 that the page (page to be processed) is specified as a non-clear toner page, the printer driver 202 shifts focus to the next page in step S3538, and advances the processing to step S3519.

On the other hand, in the case determination is made in step S3537 that the page (page to be processed) is not specified as a non-clear toner page, the printer driver 202 advances the processing to step S3534.

In step S3534 the printer driver 202 issues a clear start command, and declares that the drawing command from here on out instructs printing with a clear toner.

Next in step S3535, the printer drier 202 converts the object to be drawn from the application 200 into PDL and issues a normal drawing command as to the page thereof.

Upon all of the drawing commands of the page being issued, the printer driver 202 issues a clear end command in step S3536, and the processing is advanced to step S3526.

In step S3526 the printer driver 202 issues a page end command, and shifts focus to the next page (S3527).

Subsequently, in the case the printer driver 202 determines that processing has been repeated for steps S3518 through S3527 for all pages (S3517, S3528), the processing is advanced to step S3516, the job end command is issued, and the job is ended.

The printer driver 202 creates data such as shown in 3302 in FIG. 25B and 3402 in FIG. 36B with procedures such as shown above, and instructs the printer 150 to print using clear toner. Note that the various commands used here are only examples, and can be freely modified corresponding to the system in actual practice.

Note that with the present embodiment, description is given for a configuration performing printing instructions as to a printer with one job. However, as shown with the above-described second embodiment with reference to FIGS. 19 through 21, a drawing specified with one job from the application 200 may be divided into two jobs and issued of a color toner job and clear toner job within the printer driver 202. In this case, in the event of generating the clear toner job, the printer driver 202 inserts a blank page as to a non-clear specified page. Also, in the event of generating a color toner job, the printer driver 202 issues a blank page non-charge setting command (33040, 34040) within the color page (a color page whereupon clear toner is not layered) corresponding to the blank page within the clear toner job.

Embodiments of the present invention have been described above. With the present embodiment, clear toner (transparent toner) is taken as an example of special color toner, but similar embodiments may be used relating to special color wherein the color specification is thought to be difficult with a normal graphics engine, such as white toner or fluorescent toner.

Note that the configuration of various types of data described above and the content thereof is not limited to these, and these may be made up with various configurations and content.

While embodiments have been described above, the present invention can take a form as a system, apparatus, method, program, or computer-readable storage medium, for example. Specifically, embodiments of the present invention may be applied to a system made up of multiple devices, or may be applied to an apparatus made up of one device.

Note that a configuration wherein the above-described embodiments and modification examples thereof are combined are also all included in the present invention.

According to the various embodiments described above, with a general application only color drawings can be performed, whereby a partial coating with clear toner, which is considered to be difficult to specify with a general application, can be easily created with one job using a printer driver. That is to say, clear toner printing which overlays on a color print image can be made with an optional image that differs from the color print image. Accordingly, printing with clear toner in an optional form in an optional position can be performed. Further, a dedicated application does not have to be prepared, and an optional application can be used. Additionally, an advantage can be provided to the user such that one data file of the application is sufficient. Accordingly, a general user can easily use the clear toner.

A configuration of a memory map of the computer-readable storage medium wherein various types of data processing programs that are computer-ready with a printing control apparatus relating to embodiments of the present invention are recorded will be described with reference to the memory map shown in FIG. 38.

FIG. 38 is a diagram describing a memory map of a computer-readable storage medium (recording medium) that can be read with the printing control apparatus according to embodiments of the present invention wherein various types of data processing programs are recorded.

Note that although not shown in the diagram, information to manage a program group stored in a computer-readable storage medium, e.g. version information or creator or the like, and information depending on an OS on the program-reading side, e.g. an icon or the like to display by identifying the program, may also be stored.

Further, data belonging to the various types of programs are also managed in the directory. Also, programs for installing various types of programs in the computer, or programs to decompress when a program to be installed has been compressed, may also be stored.

The functions shown in FIGS. 18, 20, 21, and 37 of the present embodiment may be executed by a host computer with a program that is installed externally. In such as case, embodiments of the present invention are applicable in a case wherein an information group including the program is supplied to an output apparatus from a computer-readable storage medium such as a CD-ROM or flash memory or flexible disk, or from an external computer-readable storage medium via a network.

Thus, a computer-readable storage medium having recorded the program code of the software realizing the functions of the above-described embodiment can be supplied to the system or apparatus. Embodiments of the present invention can be achieved by a computer (or CPU or MPU) of such a system or apparatus reading and executing the program code stored in the computer-readable storage medium. In such a case, the program code itself that is read out from the computer-readable storage medium realizes a new function of embodiments of the present invention, and the computer-readable storage medium storing such program code makes up embodiments of the present invention.

Accordingly, the program mode of the object code, program executed by an interpreter, script data supplied to the OS may be any program mode as long as program functions are had.

A computer-readable storage medium for supplying a program may be, for example, a flexible disk, hard disk, optical disk (CD-ROM, CD-R, CD-RW, DVD), magneto-optical disk (MO), magnetic tape, non-volatile memory card, ROM, and so forth. In this case, the functions of the embodiments described above can be realized by the program code read out from the computer-readable storage medium, and the computer-readable storage medium having stored such program code makes up embodiments of the present invention.

Additionally, for a supply method of the program, the program can be supplied by using a browser on a client computer to connect to a website on the Internet, and downloading the program itself of embodiments of the present invention from the website thereof to a computer-readable storage medium such as a hard disk. Also, the program can by supplied by downloading a file including an automatic installation function that has been compressed from the website onto a computer-readable storage medium such as a hard disk. Also, the program code making up the program of embodiments of the present invention can be divided into multiple files, and can be downloaded from different websites for each file. That is to say, a WWW server and FTP server and the like which enable downloading program files for causing a computer to realize the function processing of embodiments of the present invention as to multiple users are also included in the scope of the present invention.

Also, the program of embodiments of the present invention can be encrypted, stored in a computer-readable storage medium such as a CD-ROM, and distributed to users. Further, a user having cleared predetermined conditions can download key information to decrypt the encryption from a website via the Internet. Further, the encrypted program can be executed, installed in the computer, and realized, by using the key information thereof.

Also, by executing the program code read out by the computer, not only are the functions of the embodiments described above realized, but the configuration as described below are also included. For example, a case is also included wherein, based on the instructions of the program code therein, an OS (operating system) that operates on the computer can perform a portion or all of the actual processing, and by such processing the functions of the embodiments described above are realized.

Further, the program code read out from the computer-readable storage medium may be written into memory provided to a function expansion board inserted in a computer or a function expansion unit connected to a computer. Also, a case is also included wherein, based on the instructions of the program code written in the memory, the CPU or the like provided to such function expansion board or function expansion unit performs part or all of the actual processing, and by such processing the functions of the embodiments described above are realized.

Also, embodiments of the present invention may be applied to a system made up of multiple apparatuses, or may be applied to equipment made up of one apparatus. Also, embodiments of the present invention may be applied in a case wherein the program is supplied to a system or apparatus to achieve embodiments of the present invention. In this case, a computer-readable storage medium storing the program reads out the program expressed by the software to achieve embodiments of the present invention to the system or apparatus, whereby the system or device thereof can enjoy the advantages of the present invention.

Embodiments of the present invention are not limited to the above-described embodiments, and various modifications based on the essence of embodiments of the present invention (including organic combinations of the various embodiments) can be made, which are not to be excluded from the scope of the present invention.

Various examples and embodiments have been used to describe the present invention, but it will be apparent to one skilled in the art that the spirit and scope of the present invention are not limited to particular descriptions within the present Specification.

Note that configurations wherein the above-described various embodiments and modification examples thereof are combined are also all included in the present invention.

As described above, in the event of using data created with a general application to specify printing by layering the color toner image and optional special color toner image, embodiments of the present invention exhibit an advantage wherein flexible specifying can be performed.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-180983 filed Jul. 11, 2008, which is hereby incorporated by reference herein in its entirety.

What is claimed is:

1. A printing control apparatus for transmitting a job for printing using a plurality of color toners and a special toner, comprising:
   a special toner page specifying unit configured to specify that at least one page of a received page group from an application is to be printed using the special toner;
   a job generating unit configured to generate a job including data to layer and print to the same face of the same sheet with a special toner page that is a page specified by the special toner page specifying unit, and a color toner page which is a page not specified by the special toner page specifying unit; and
   a transmission unit configured to transmit the job generated by the job generating unit to a printing apparatus.

2. The printing control apparatus according to claim 1, wherein the special toner page specifying unit specifies a page to perform printing using the special toner for even-numbered pages or odd-numbered pages out of the page group received from the application; and
   wherein the job generating unit generates a job including data for printing the special toner page and the color toner page, wherein the color toner page is the page that is one page before or one page after the special toner page in the received page group, such that the special toner page is layered to the same face of the same sheet to which a corresponding color toner page is to be printed.

3. The printing control apparatus according to claim 1, wherein the special toner page specifying unit specifies a page to perform printing using the special toner for the first half of pages or the second half of pages out of the received page group; and
   wherein the job generating unit generates a job including data for printing the special toner page and the color toner page, wherein the color toner page corresponds in page sequence to the special toner page, such that a special toner page is layered to the same face of the same sheet to which a corresponding color toner page is to be printed.

4. The printing control apparatus according to claim 1, wherein the special toner page specifying unit specifies a page to perform printing using the special toner for arbitrary pages out of the received page group received from the application; and
   wherein the job generating unit instructs the printing apparatus to print the special toner page and the color toner page, such that a special toner page is layered to the same face of the same sheet to which a corresponding color toner page is to be printed.

5. The printing control apparatus according to claim 1, wherein, in the case that layout printing to lay out a plurality of pages on the same face of the same sheet and print is specified, the job generating unit performs layout so as to print a plurality of color toner pages on the same face and overlays the special toner pages corresponding to the layout of the color toner pages to be printed, and generates a job.

6. The printing control apparatus according to claim 1, wherein, in the case that saddle-stitch binding printing is specified, the job generating unit performs layout so as to print on both sides of a sheet such that the color toner pages can be bound as saddle-stitch binding and overlays the special toner pages corresponding to the layout of the color toner pages to be printed, and generates a job.

7. The printing control apparatus according to claim 1, wherein, in the case that duplex binding printing is specified, the job generating unit performs processing so as to create a blank margin on the edge portion according to the printed face of the color toner pages, and creates a blank margin corresponding to the blank margin created on the color toner page for the corresponding special toner page to be overlaid and printed on the corresponding color toner page.

8. The printing control apparatus according to claim 1, further comprising:
   a non-special toner printing specified page specifying unit configured to specify a non-special toner printing specified page wherein at least one page of the special toner pages is not printed with the printing apparatus;
   wherein the job generating unit generates a job including data for the purpose of not printing, with the printing apparatus, the special toner page specified to the non-special toner printing specified page by the non-special toner printing specified page specifying unit.

9. The printing control apparatus according to claim 1, wherein the job generating unit generates a job including data for form registration of the special toner page to the printing apparatus.

10. The printing control apparatus according to claim 9, wherein the job generating unit inserts a blank page between the special toner pages in the event of form registration of the special toner page to the printing apparatus.

11. The printing control apparatus according to claim 1, wherein the special toner is one of a toner for adjusting glossiness, and a toner other than cyan, magenta, yellow and black.

12. The printing control apparatus according to claim 11, wherein the special toner is a clear toner.

13. A printing control apparatus for transmitting a job for printing using a plurality of color toners and a special toner, comprising:
- a page generating unit configured to generate a special toner page for layering and printing by using the special toner on an image object, corresponding to a page which has the image object and is included in a received page group from an application;
- a job generating unit configured to generate a job including data to layer and print to the same face of the same sheet with a special toner page that is generated with said page generating unit, and a color toner page which is a page received from the application; and
- a transmission unit configured to transmit the job generated by the unit configured to generate to the printing apparatus.

14. A method carried out by a printing control apparatus to transmit a job for printing using a plurality of color toners and a special toner, comprising the steps of:
- specifying that at least one page of a received page group from an application is to be printed using the special toner;
- generating a job including data to layer and print to the same face of the same sheet with a special toner page that is a page specified in the specifying of the special toner page, and a color toner page which is a page not specified in the specifying of the special toner page; and
- transmitting the job generated in the generating to a printing apparatus.

15. A non-transitory computer-readable storage medium that stores a program to cause a computer to execute a method for transmitting a job for printing using a plurality of color toners and a special toner, the method comprising:
- specifying that at least one page of a received page group from an application is to be printed using the special toner;
- generating a job including data to layer and print to the same face of the same sheet with a special toner page that is a page specified in the specifying the special toner page, and a color toner page which is a page not specified in the specifying of the special toner page; and
- transmitting the job generated in the generating to a printing apparatus.

* * * * *